US011601870B2

(12) United States Patent
Takeda et al.

(10) Patent No.: US 11,601,870 B2
(45) Date of Patent: Mar. 7, 2023

(54) TERMINAL, RADIO COMMUNICATION METHOD AND BASE STATION TO MONITOR SEARCH SPACES

(71) Applicant: NTT DOCOMO, INC., Tokyo (JP)

(72) Inventors: Kazuki Takeda, Tokyo (JP); Satoshi Nagata, Tokyo (JP); Qin Mu, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/469,245

(22) PCT Filed: Dec. 14, 2017

(86) PCT No.: PCT/JP2017/044818
§ 371 (c)(1),
(2) Date: Jun. 13, 2019

(87) PCT Pub. No.: WO2018/110619
PCT Pub. Date: Jun. 21, 2018

(65) Prior Publication Data
US 2020/0107245 A1 Apr. 2, 2020

(30) Foreign Application Priority Data
Dec. 14, 2016 (JP) .............................. JP2016-242219

(51) Int. Cl.
H04W 48/12 (2009.01)
H04L 5/00 (2006.01)
(Continued)

(52) U.S. Cl.
CPC ........... H04W 48/12 (2013.01); H04L 5/0094 (2013.01); H04W 72/042 (2013.01); H04W 72/0453 (2013.01)

(58) Field of Classification Search
CPC ............... H04W 48/12; H04W 72/042; H04W 72/0453; H04L 5/0094; H04L 5/0007; H04L 5/0053
See application file for complete search history.

(56) References Cited

U.S. PATENT DOCUMENTS

2013/0194931 A1* 8/2013 Lee ........................ H04W 72/04
370/241
2013/0343307 A1* 12/2013 Desai .................... H04W 74/08
370/329
(Continued)

FOREIGN PATENT DOCUMENTS

KR 20140126345 A * 10/2014 ............ H04W 72/04
WO 2016/047618 A1 3/2016

OTHER PUBLICATIONS

MediaTek Inc. On 2-stage Downlink Control Information for NR, 3GPP TSG RAN WG1 Meeting #87,R1-1612121, Reno, USA, Nov. 14-18, 2016 (Year: 2016).*
(Continued)

Primary Examiner — Mounir Moutaouakil
(74) Attorney, Agent, or Firm — Osha Bergman Watanabe & Burton LLP

(57) ABSTRACT

The present invention is designed so that communication is performed appropriately in radio communication systems that support different numerologies than existing LTE systems. A receiving section that receives a downlink control channel, and a control section that controls the detection of search spaces that serve as candidates for allocating the downlink control channel are provided, and the control section controls the detection of a common search space and a user-specific search space, in which different subcarrier spacings and/or different transmission cycles are configured.

5 Claims, 17 Drawing Sheets

(51) Int. Cl.
*H04W 72/04* (2023.01)
*H04W 72/0453* (2023.01)

(56) References Cited

U.S. PATENT DOCUMENTS

| | | | | |
|---|---|---|---|---|
| 2014/0086188 | A1* | 3/2014 | Hoymann | H04L 5/001 370/329 |
| 2014/0177556 | A1* | 6/2014 | Pan | H04L 1/0038 370/329 |
| 2014/0293942 | A1 | 10/2014 | Kang et al. | |
| 2015/0208390 | A1* | 7/2015 | Zhao | H04W 72/042 370/330 |
| 2015/0289144 | A1* | 10/2015 | Yi | H04W 72/042 370/252 |
| 2016/0301502 | A1* | 10/2016 | Cheng | H04L 5/0094 |
| 2016/0353440 | A1* | 12/2016 | Lee | H04W 72/0453 |
| 2017/0094688 | A1* | 3/2017 | Lee | H04W 48/12 |
| 2017/0290017 | A1* | 10/2017 | Takeda | H04W 72/04 |
| 2017/0303247 | A1* | 10/2017 | Yasukawa | H04W 72/042 |
| 2018/0132272 | A1* | 5/2018 | Sun | H04L 1/0038 |
| 2018/0152822 | A1* | 5/2018 | Lee | H04W 48/12 |
| 2018/0152923 | A1* | 5/2018 | Xiong | H04L 5/0094 |
| 2018/0241532 | A1* | 8/2018 | Kakishima | H04B 7/0626 |
| 2018/0279268 | A1* | 9/2018 | You | H04L 5/0035 |
| 2018/0310283 | A1* | 10/2018 | Deenoo | H04L 5/0048 |
| 2018/0352500 | A1* | 12/2018 | Baldemair | H04L 5/005 |

OTHER PUBLICATIONS

International Search Report issued in PCT/JP2017/044818 dated Mar. 6, 2018 (2 pages).
Written Opinion of the International Searching Authority issued in PCT/JP2017/044818 dated Mar. 6, 2018 (4 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
MediaTek Inc.; "DL Control Channel Design for NR"; 3GPP TSG RAN WG1 Meeting #87, R1-1612120; Reno, USA Nov. 14-18, 2016 (4 pages).
Extended European Search Report issued in the counterpart European Patent Application No. 17880923.2, dated Jul. 30, 2020 (9 pages).
Panasonic; "Discussion on Single level DCI and two-level DCI"; 3GPP TSG RAN WG1 Meeting #86bis, R1-1609575 Lisbon, Portugal, Oct. 10-14, 2016 (5 pages).
NTT DOCOMO; "Initial views on DL control channel design"; 3GPP TSG RAN WG1 Meeting #86bis, R1-1610058 Lisbon, Portugal, Oct. 10-14, 2016 (7 pages).
ZTE, ZTE Microelectronics; "NR Downlink DCI Design and Procedure"; 3GPP TSG RAN WG1 Meeting #87, R1-1611293; Reno, USA, Nov. 14-18, 2016 (4 pages).
Office Action issued in the counterpart Chinese Patent Application No. 201780085931.8, dated Mar. 15, 2021 (29 pages).
Office Action issued in the counterpart European Patent Application No. 17880923.2, dated Jun. 14, 2021 (9 pages).
Office Action issued in Chinese Application No. 201780085931.8 dated Oct. 26, 2021(13 pages).
Oral Proceedings issued in European Application No. 17880923.2 dated Dec. 20, 2021 (7 pages).
Office Action in counterpart Japanese Patent Application No. 2018-556729 dated Feb. 22, 2022 (8 pages).
Office Action in counterpart Chinese Patent Application No. 201780085931.8 dated Mar. 11, 2022 (10 pages).
Office Action issued in Japanese Application No. 2018-556729; dated Aug. 16, 2022 (7 pages).

* cited by examiner

TERMINAL, RADIO COMMUNICATION METHOD AND BASE STATION TO MONITOR SEARCH SPACES

TECHNICAL FIELD

The present invention relates to a user terminal and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower latency and so on (see non-patent literature 1). Also, the specifications of LTE-A (also referred to as "LTE-advanced," "LTE Rel. 10," "LTE Rel. 11," or "LTE Rel. 12") have been drafted for further broadbandization and increased speed beyond LTE (also referred to as "LTE Rel. 8" or "LTE Rel. 9"), and successor systems of LTE (also referred to as, for example, "FRA (Future Radio Access)," "5G (5th generation mobile communication system)," "5G+(plus)," "NR (New Radio)," "NX (New radio access)," "New RAT(Radio Access Technology)," "FX (Future generation radio access)," "LTE Rel. 13," "LTE Rel. 14," "LTE Rel. 15" or later versions) are under study.

In LTE Rel. 10/11, carrier aggregation (CA) to integrate multiple component carriers (CC) is introduced in order to achieve broadbandization. Each CC is configured with the system bandwidth of LTE Rel. 8 as one unit. Furthermore, in CA, a plurality of CCs of the same radio base station (referred to as an "eNB" (evolved Node B), a "BS" (Base Station) and so on) are configured in a user terminal (UE: User Equipment).

Meanwhile, in LTE Rel. 12, dual connectivity (DC), in which multiple cell groups (CGs) formed by different radio base stations are configured in a UE, is also introduced. Each cell group is comprised of at least one cell (CC). In DC, since multiple CCs of different radio base stations are integrated, DC is also referred to as "inter-eNB CA."

Also, in existing LTE systems (LTE Rel. 8 to 12), frequency division duplex (FDD), in which downlink (DL) transmission and uplink (UL) transmission are made in different frequency bands, and time division duplex (TDD), in which downlink transmission and uplink transmission are switched over time and made in the same frequency band, are introduced.

CITATION LIST

Non-Patent Literature

Non-Patent Literature 1: 3GPP TS36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Future radio communication systems (for example, 5G, NR, etc.) are expected to realize various radio communication services so as to fulfill varying requirements (for example, ultra high speed, large capacity, ultra-low latency, etc.). For example, regarding 5G/NR, studies are in progress to provide radio communication services, referred to as "eMBB (enhanced Mobile Broad Band)," "IoT (Internet of Things)," "mMTC (massive Machine Type Communication)," "M2M (Machine To Machine)," and "URLLC (Ultra Reliable and Low Latency Communications)."

In addition, 5G/NR is expected to support flexible use of numerologies and frequencies, and realize a dynamic frame formats. A "numerology" refers to, for example, a set of communication parameters (for example, subcarrier spacing, bandwidth, etc.) applied to transmission and receipt of a certain signal.

However, how to control transmission/receipt in communication when different numerologies (subcarrier spacing, bandwidth etc.) from those of existing LTE systems are supported, is not decided yet. While it may be possible to use the control techniques used in existing LTE systems on an-is basis, in this case, there is a possibility that proper transmission and/or receipt of signals (for example, transmission and/or reception of a downlink control channel) may be disabled, and problems such as a decrease in throughput might occur.

The present invention has been made in view of the above, and it is therefore an object of the present invention to provide a user terminal and a radio communication method to enable proper communication in a radio communication system that supports different numerologies than existing LTE systems.

Solution to Problem

According to one aspect of the present invention, a user terminal has a receiving section that receives a downlink control channel, and a control section that controls the detection of search spaces that serve as candidates for allocating (assigning) the downlink control channel are provided, and the control section controls the detection of a common search space and a user-specific search space, in which different subcarrier spacings and/or different transmission cycles (periodicities) are configured.

Advantageous Effects of Invention

According to the present invention, it is possible to communicate properly in a radio communication system that supports different numerologies than existing LTE systems.

DESCRIPTION OF EMBODIMENTS

Figure 1:
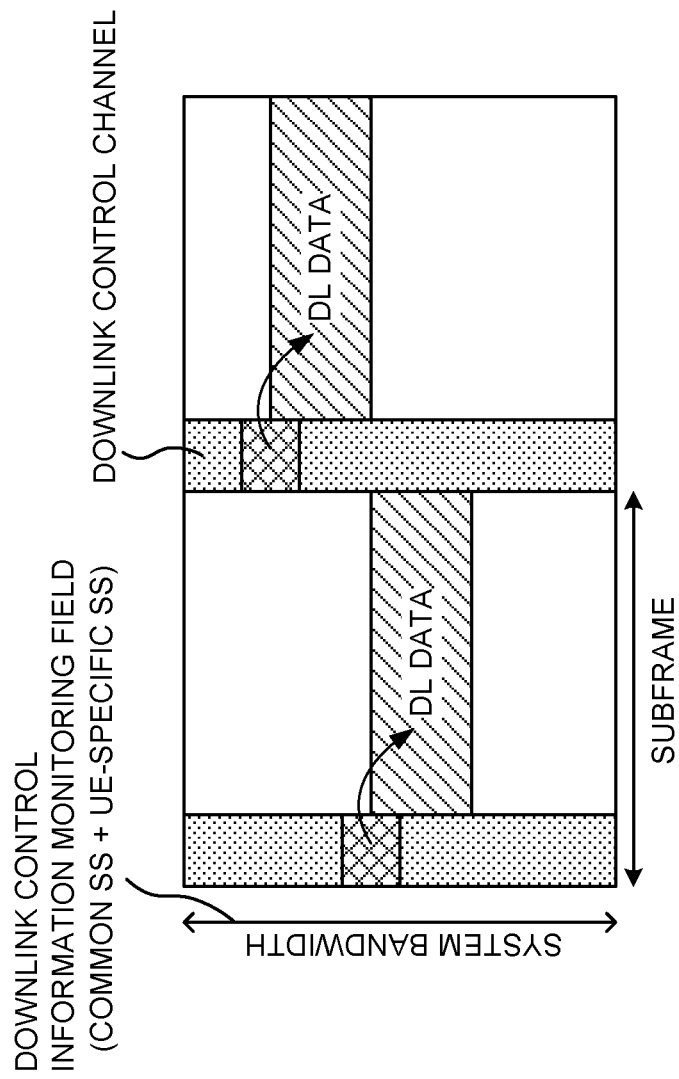
FIG. 1 is a diagram to show an example of a downlink control channel in existing LTE systems.

In existing LTE systems, a base station transmits downlink control information (DCI) to a UE using a downlink control channel (for example, PDCCH (Physical Downlink Control Channel), enhanced PDCCH (EPDCCH (Enhanced PDCCH), etc.). Transmission of downlink control information may be interpreted as transmission of a downlink control channel.

DCI includes, for example, data-scheduling time/frequency resources, transport block information, data modulation scheme information, HARQ retransmission information, demodulation RS information, and so on. DCI that schedules receipt of DL data and/or measurement of DL reference signals may be referred to as "DL assignment" or "DL grant." DCI that schedules transmission of UL data and/or transmission of UL sounding (measurement) signals may be referred to as "UL grant." DL assignment and/or UL grant may include information related to the resources, sequence, transmission format, etc. of the transmission channel for transmitting UL control signals (UCI: Uplink Control Information) such as HARQ-ACK feedback in response to DL data, channel measurement information (CSI: Channel State Information) and so on. In addition to DL assignment and UL grant, DCI for scheduling UL control signals (UCI: Uplink Control Information) may be defined.

The UE is configured to monitor a set of a predetermined number of downlink control channel candidates. Monitoring here means, for example, attempting to decode each downlink control channel for the target DCI format in the set. Such decoding is also referred to as "blind decoding (BD)" or "blind detection." The downlink control channel candidates are also referred to as "BD candidates," "(E)PDCCH candidates," and so on.

The set of downlink control channel candidates (multiple downlink control channel candidates) to be monitored is also referred to as "search space." The base station places DCI in a predetermined downlink control channel candidates included in the search space. The UE performs blind decoding for one or more candidate resources in the search space, and detects the DCI addressed to the UE. The search space may be configured by high layer signaling that is common between users, or may be configured by user-specific high layer signaling. Also, two or more search spaces may be configured, for the user terminal, in the same carrier.

In existing LTE (LTE Rel. 8 to 12), a plurality of aggregation levels (ALs) are provided in the search space for the purpose of link adaptation. The ALs correspond to the numbers of control channel elements (CCEs)/enhanced control channel elements (ECCEs: Enhanced CCEs) that constitute DCI. Also, the search space is configured so that there are multiple downlink control channel candidates for a given AL. Each downlink control channel candidate is comprised of one or more resource units (CCEs and/or ECCEs).

Cyclic redundancy check (CRC) bits are attached to the DCI. The CRC is masked (scrambled) using UE-Specific identifiers (for example, cell-radio network temporary identifiers (C-RNTIs)) or a system-common identifier. The UE can detect the DCI where the CRC is scrambled using the C-RNTI for the subject terminal, and the DCI where the CRC is scrambled using the system-common identifier.

Also, as for the search spaces, there are a common search space (C-SS) that is configured for UEs on a shared basis, and a UE-specific search space (UE-SS) that is configured for each UE. In the UE-specific search space for the existing LTE PDCCH, the ALs(=the numbers of CCEs) are 1, 2, 4 and 8. The numbers of BD candidates defined in association with the ALs=1, 2, 4 and 8 are 6, 6, 2 and 2, respectively.

Now, 5G/NR is required to support flexible use of numerologies and frequencies, and realize dynamic frame formats. Here, a numerology refers to a set of frequency region (frequency domain) and/or time region (time domain) communication parameters (for example, at least one of the subcarrier spacing (SCS), the bandwidth, the duration of symbols, the duration of cyclic prefixes (CPs), the duration of transmission time intervals (TTIs), the number of symbols per TTI, the format of radio frames, the filtering process, the windowing process and so on).

In eMBB, which is designed for high-speed communication, it is preferable to use numerologies that can reduce overhead and numerologies that provide support for high-order MIMO, so as to achieve high spectral efficiency. For example, 5G/NR may support eMBB and/or the like over a wide frequency band (for example, from 1 GHz or less, up to 100 GHz). In this case, different operations may be designed between frequency bands that are equal to or less than a predetermined frequency band (for example, 6 GHz), and frequency bands that are greater than the predetermined frequency band).

For example, when eMBB is used (use case 1) below a predetermined frequency band (for example, 6 GHz), digital beamforming (full digital BF) may be applied. In this case, it is unnecessary to take into account the limitations that apply when using analog beamforming (for example, the limitations of scheduling in the frequency domain). Also, since stand-alone operation is required, it is necessary to communicate using a common search space (non-UE-specific search space). In addition, the communication performance to be expected is equal to or greater than existing LTE.

Also, when eMBB is used (use case 2) in a larger frequency band than a predetermined frequency band (for example, 6 GHz), analog beamforming (some/full analog BF) may be applied, at least partially. In this case, it is necessary to take into consideration the limitations of analog beamforming (for example, the limitations of scheduling in the frequency domain). Basically, since non-stand-alone operation is performed, it is not necessary to communicate using a common search space (non-UE-specific search space). Also, as for the performance of communication, a level at which the quality of communication can be maintained sufficiently in dense, urban micro layers is required.

Thus, the present inventors have focused on the fact that, in 5G/NR, it is desirable to flexibly control the transmission method for downlink control channels (for example, the design of search spaces in downlink control channels) according to, for example, the frequency band used for communication, the requirements applied (for example, whether or not stand-alone operation is used), and so on.

However, in existing LTE systems, a downlink control channel (or downlink control information) is transmitted using the whole system bandwidth, and, in each subframe, a common search space and a user-specific search space are configured (see FIG. 1). Also, the same subcarrier spacing (SCS) and transmission cycle are applied to the common search space and the user-specific search space.

So the present inventors have come up with the idea of controlling communication by applying different subcarrier spacings and/or different transmission cycles (periodicities) to the common search space (C-SS) and user-specific search spaces (UE-SSs). By this means, it becomes possible to configure the design (for example, the arrangement of C-SS and UE-SS) of downlink control channels in a flexible manner, and to communicate adequately even in radio communication systems that support different numerologies than existing LTE systems.

Now, embodiments of the present invention will be described in detail below with reference to the accompanying drawings. Note that the radio communication methods according to individual embodiments may be applied individually or may be applied in combination.

(First Aspect)

Based on the first aspect of the present invention, an example of a case will be described below, in which, in a downlink control channel (also referred to as "NR-PDCCH"), different subcarrier spacings and transmission cycles (periodicities) are applied to a common search space (C-SS) and a user-specific search space (UE-SS). Although the following description will illustrate a case where different subcarrier spacings and cycles are configured between a C-SS and a UE-SS, one of the subcarrier spacing and the cycle may be the same between the C-SS and the UE-SS.

Figure 2:
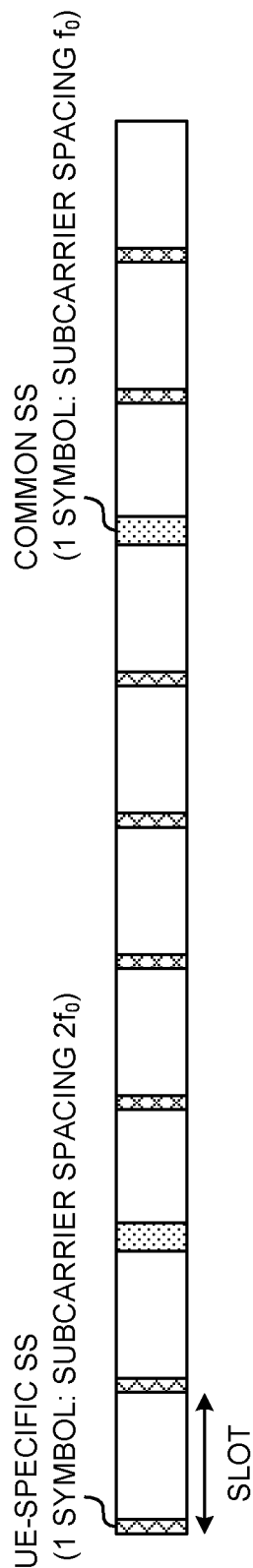
FIG. 2 is a diagram to show an example of the method of transmitting C-SS and UE-SS.

FIG. 2 shows an example of a case where downlink control information is transmitted by applying, to the C-SS of the NR-PDCCH, a subcarrier spacing (SCS) and a transmission cycle that are lower (or narrower) and longer than those of the UE-SS. FIG. 2 shows a case where the subcarrier spacing for the C-SS is made $f_0$ and where the subcarrier spacing for the UE-SS is made twice ($2f_0$) as high (or wide). In this case, the symbol duration to use when transmitting the C-SS can be made longer than the symbol duration to use when transmitting the UE-SS. The values of subcarrier spacing for the C-SS and the UE-SS are not limited to these values.

In addition, FIG. 2 shows a case where the C-SS and the UE-SS are each time-multiplexed (TDM) per predetermined time period (time region, time domain) (which is also referred to as a "time interval," a "transmission unit," etc.). The predetermined time periods (time regions, time domains) may be provided in radio frame, subframe, slot or minislot units. In the following description, an example of a case will be shown where a slot is a predetermined period of time.

The cycle of the C-SS and/or the UE-SS can be configured based on the number of predetermined time periods or a predetermined time (for example, 1 ms, 5 ms, 10 ms, etc.).

FIG. 2 shows a case where the predetermined time periods are defined with slots, and where and the cycle of the C-SS is five slots. Also, in the case illustrated here, the cycle of the UE-SS is one slot, and the UE-SS is not placed in time periods where the C-SS is provided.

When transmitting the C-SS of the downlink control channel by applying a lower subcarrier spacing than that of the UE-SS, the symbol duration can be set long, so that it is possible to transmit the C-SS by reserving a sufficient CP duration. This makes it possible to reserve the coverage of the C-SS.

Also, by applying, to the UE-SS in the downlink control channel, a higher (or wider) subcarrier spacing and a shorter transmission cycles than those of the C-SS (or by transmitting the UE-SS a larger number of times), processes using the UE-SS can be accelerated. Information about the transmission cycle or the transmission position of the UE-SS (the time period in which the UE-SS is transmitted), may be reported (configured) from the base station to the user terminal, or may be stipulated in advance in the specification. When the base station reports this information to the user terminal, the base station can use higher layer signaling and/or physical layer signaling (also referred to as "L1 control signaling," "downlink control information," etc.).

In the event non-stand-alone operation (NSA operation) is used, it is possible not to configure the cycle of the C-SS, or it is also possible to configure a long cycle (for example, a cycle longer than a predetermined value). For example, if no information related to the cycle of the C-SS cycle is reported (or if the cycle is longer than a predetermined value), the user terminal can control communication assuming that non-stand-alone operation will be performed.

The user terminal performs blind decoding for the DL control channel of the C-SS in the time/frequency resources where the C-SS is configured, and performs blind decoding for the DL control channel of the UE-SS in the time/frequency resources where the UE-SS is configured.

Figure 3A:
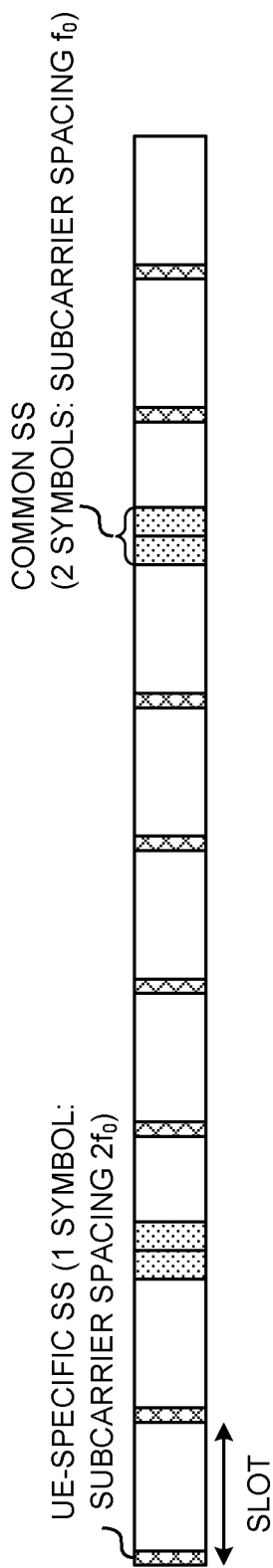
FIGS. 3A and 3B are diagrams to show other examples of methods of transmitting C-SS and UE-SS.
Figure 3B:
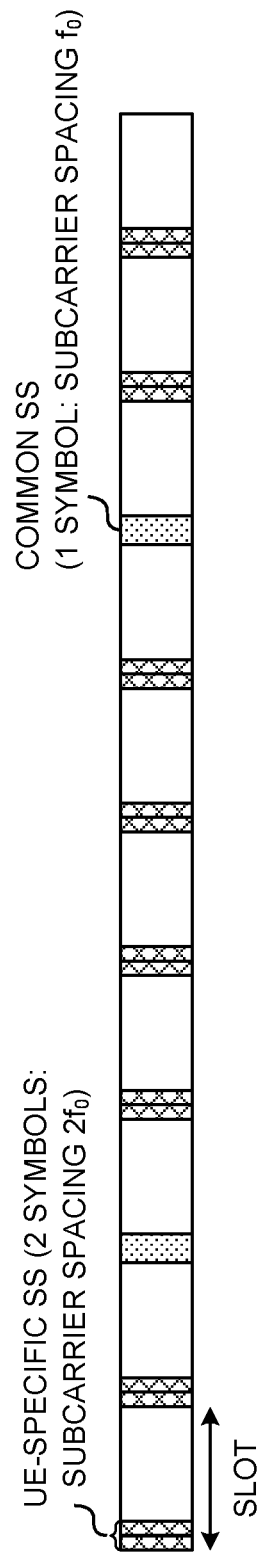

Also, the number of symbols in DL control resources for use for transmitting the C-SS and the UE-SS and/or the frequency resources may be configured separately (for example, with different numbers of symbols and/or frequency resources) (see FIG. 3). FIG. 3A shows a case where the UE-SS is transmitted using one symbol with a subcarrier spacing of $2f_0$, and where the C-SS is transmitted using two symbols with a subcarrier spacing of $f_0$. Meanwhile, FIG. 3B shows a case where the UE-SS is transmitted using two symbols with a subcarrier spacing of $2f_0$, and where the C-SS is transmitted using one symbol with a subcarrier spacing of $f_0$. Obviously, the number of symbols that can be configured for C-SS and UE-SS is not limited to this.

Information about the number of symbols to use to transmit the C-SS and the number of symbols (and/or the frequency resources) to use to transmit the UE-SS can be reported from the base station to the user terminal using higher layer signaling and/or physical layer signaling. As for physical layer signaling, a signal that specifies the number of UE-SS symbols (and/or the frequency resources) like the PCFICH (for example, a sequence, etc.) that is defined in existing LTE systems (PCFICH-like signal) may be used.

For example, both the information about the number of symbols (and/or the frequency resources) that are used to transmit the C-SS and the information about the number of symbols (and/or the frequency resources) that are used to transmit the UE-SS can be transmitted from the base station to the user terminal via higher layer signaling and/or physical layer signaling. Alternatively, it may be possible to transmit one of the information about the number of symbols (and/or the frequency resources) to use to transmit the C-SS and the information about the number of symbols (and/or the frequency resources) to use to transmit the UE-SS to the user terminal using higher layer signaling, and transmit the other one to the user terminal using physical layer signaling.

When reporting the number of symbols (and/or the frequency resources) to use to transmit the C-SS via higher layer signaling and reporting the number of symbols (and/or the frequency resources) to use to transmit the UE-SS via physical layer signaling, the C-SS, which requires a high decoding success rate, can achieve reliability that does not depend on the decoding success rate of the signal (PCFICH-like signal) that specifies the number of symbols (and/or the frequency resources) for the UE-SS, like the PCFICH (for example, a sequence, etc.). In addition, by dynamically and flexibly controlling the number of symbols (and/or the frequency resources) for the UE-SS, it is possible to suppress an increase in overhead.

Also, when reporting the number of symbols (and/or the frequency resources) to use to transmit the C-SS via physical layer signaling and reporting the number of symbols (and/or the frequency resources) used to transmit the UE-SS via higher layer signaling, the overhead of the C-SS, which is not frequently used in data scheduling, can be reduced.

The physical layer signaling (PCFICH-like signal) to specify the number of symbols (and/or the frequency resource) may be able to designate zero (no SS) for the number of symbols (and/or the frequency resources) for the C-SS. In this case, if the user terminal detects that this physical layer signaling (PCFICH-like signal) designates zero, the user terminal can skip blind decoding in the pertaining SS.

Also, when the user terminal performs the decoding process (for example, blind decoding), the user terminal detects a search space (downlink control resource set), comprised of a predetermined number of blind decoding candidates (downlink control channel candidates) for each of the C-SS and the UE-SS. In this case, the number of symbols corresponding to one blind decoding candidate in the C-SS and the number of symbols corresponding to one blind decoding candidate in the UE-SS may be configured separately (for example, different numbers of symbols may be configured).

Information about the number of symbols corresponding to one blind decoding candidate in the C-SS and the number of symbols corresponding to one blind decoding candidate in the UE-SS can be reported from the base station to the user terminal via higher layer signaling and/or physical layer signaling. As for the physical layer signaling here, for example, a signal (PCFICH-like signal) reusing the PCFICH (for example sequence, etc.) defined in existing LTE systems may be used.

For example, information about the number of symbols corresponding to one blind decoding candidate in the C-SS and information about the number of symbols corresponding to one blind decoding candidate in the UE-SS may be both reported from the base station to the user terminal via higher layer signaling and/or physical layer signaling. Alternatively, it may be possible to report one of the information about the number of symbols corresponding to one blind decoding candidate in the C-SS and the information about the number of symbols corresponding to one blind decoding candidate in the UE-SS to the user terminal via higher layer signaling, and report the other one to the user terminal via physical layer signaling.

Figure 4:
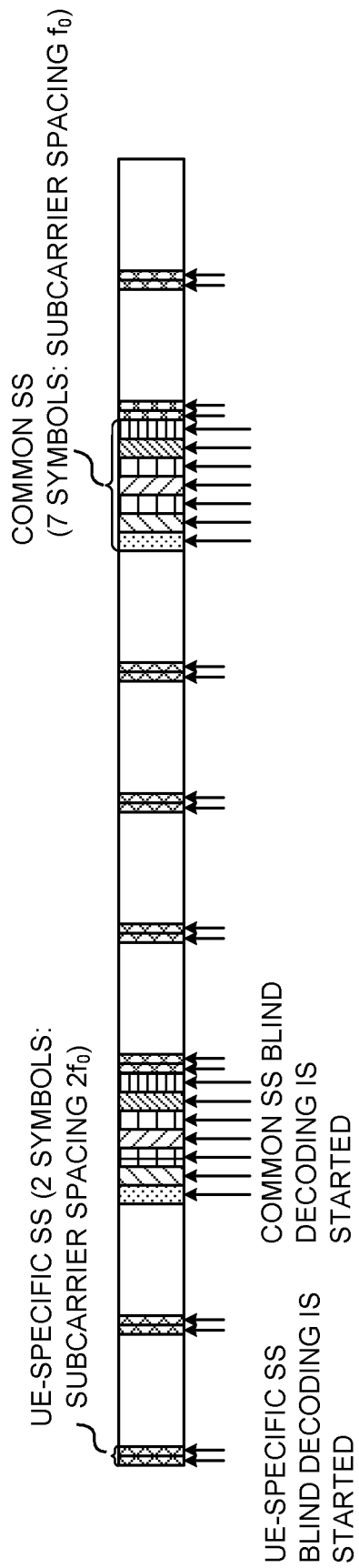
FIG. 4 is a diagram to show another example of the method of transmitting C-SS and UE-SS.

Also, the number of starting positions of blind decoding candidates in a predetermined time period (for example, in a slot, in a minislot, etc.) where blind decoding is started may be configured separately for the C-SS and the UE-SS (for example, different numbers of symbols may be configured) (see FIG. 4). In FIG. 4, a case is shown where the UE-SS is transmitted using two symbols at subcarrier spacing of $2f_0$, and where the C-SS is transmitted using seven symbols at subcarrier spacing of $f_0$. Also, in the case illustrated here, the cycle of the C-SS is five slots, the cycle of the UE-SS is one slot, and the UE-SS is not configured in time periods where the C-SS is provided.

For example, the C-SS and/or the UE-SS can be configured so that blind decoding is started per symbol. Referring to FIG. 4, the user terminal starts blind decoding for the two symbols in one slot (or minislot) where the U E-SS is configured, from two different starting positions. Meanwhile, the user terminal starts blind decoding for the seven symbols in one slot (or minislot) where the C-SS is configured, from seven different starting positions.

In this way, the number of starting positions of blind decoding candidates is configured separately between the C-SS and the UE-SS, so that, for example, DL control signals for the C-SS can be transmitted in a number of different beams to match the number of symbols (seven symbols in this case), by applying a different transmitting beam to each symbol, and DL control signals for the UE-SS can be transmitted using transmitting beams that suitably deliver the DL control signals to the user terminal. In this case, common control signals may be transmitted in various beams, without relying on user-specific beams, so as to be received by all users, and user-specific control signals may be transmitted only to specific users, using user-specific beams, so that it is possible to suppress interference against other cells.

Although FIG. 4 shows a case where starting positions are configured on a per symbol basis, this is by no means limiting. These starting positions may be configured for every predetermined number of symbols. Besides, the units of symbols for placing starting positions may be configured separately (for example, in different values) between the C-SS and the UE-SS.

Although cases have been described above with reference to FIGS. 2 to 4 where the C-SS and the UE-SS are arranged across the system band, the C-SS and/or the UE-SS may not be arranged across the system band. For example, the C-SS and/or the UE-SS may be placed in partial frequency regions (domains) (also referred to as "frequency bands") within the system band (see FIG. 5).

Figure 5:
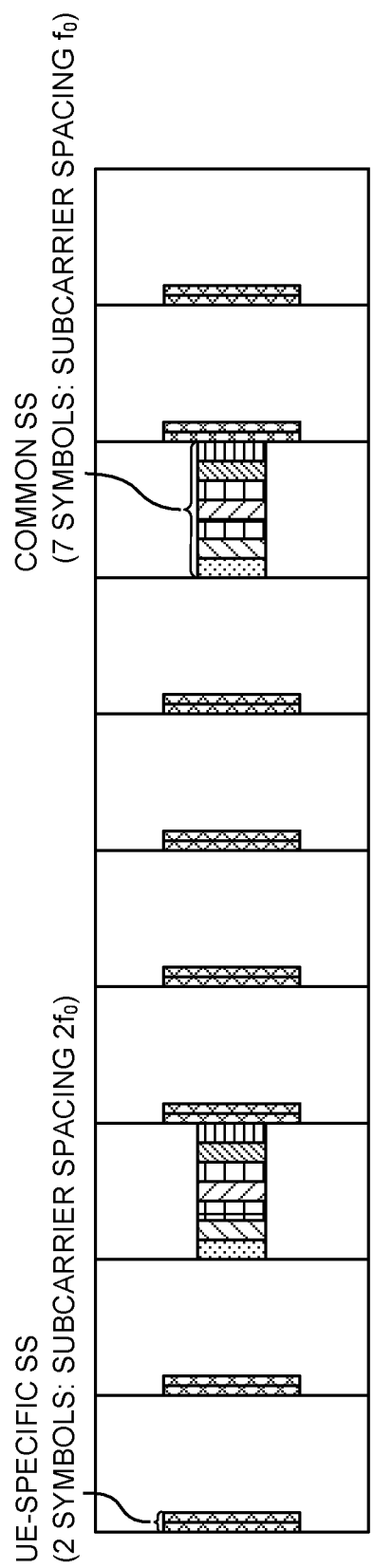
FIG. 5 is a diagram to show another example of the method of transmitting C-SS and UE-SS.

FIG. 5 shows a case where the UE-SS is transmitted using two symbols with a subcarrier spacing of $2f_0$ and where the C-SS is transmitted using seven symbols with a subcarrier spacing of $f_0$. In the case shown here, the cycle of the C-SS is five slots, the cycle of the UE-SS is one slot and the C-SS is not configured in time periods where the UE-SS is provided. Furthermore, a case is shown here where the frequency regions (domains) in which the UE-SS is placed is wider than the frequency regions (domains) in which the C-SS is placed.

FIG. 5 shows a case where the frequency region where the C-SS is placed and the frequency region where the UE-SS is placed at least partially overlap. In this way, by allowing the frequency region where the C-SS is placed and the frequency region where the UE-SS is placed to overlap, it is possible to suppress the proportion (overhead) which control channels occupy in radio resources. Also, the frequency region in which the C-SS is placed (or the frequency region in which the UE-SS is placed) may be configured to serve as a subband of the frequency region in which the UE-SS is placed (or the frequency region in which the C-SS is placed).

Alternatively, the frequency region where the C-SS is placed and the frequency region where the UE-SS is placed may be provided in separate frequency regions. Also, regarding the relationship between the frequency region to place the C-SS and the frequency region to place the UE-SS, it is not always necessary to define a super-set and/or a sub-set, and the C-SS and the UE-SS can be arranged in a more flexible manner. The C-SS and the UE-SS may be configured to occupy the same frequency resources.

(Second Aspect)

Although a case has been described above with the first aspect of the present invention where a C-SS and a UE-SS are each time-multiplexed (TDM) in a predetermined time period, the present embodiment is by no means limited to this. Now, in accordance with a second aspect of the present invention, a case will be described below where a C-SS and a UE-SS are placed (for example, frequency-multiplexed (FDM)) so as to co-exist in the same time period. Note that, although a case will be shown in the following description where the C-SS and UE-SS are arranged in a part of the system band, this is by no means limiting.

Figure 6:
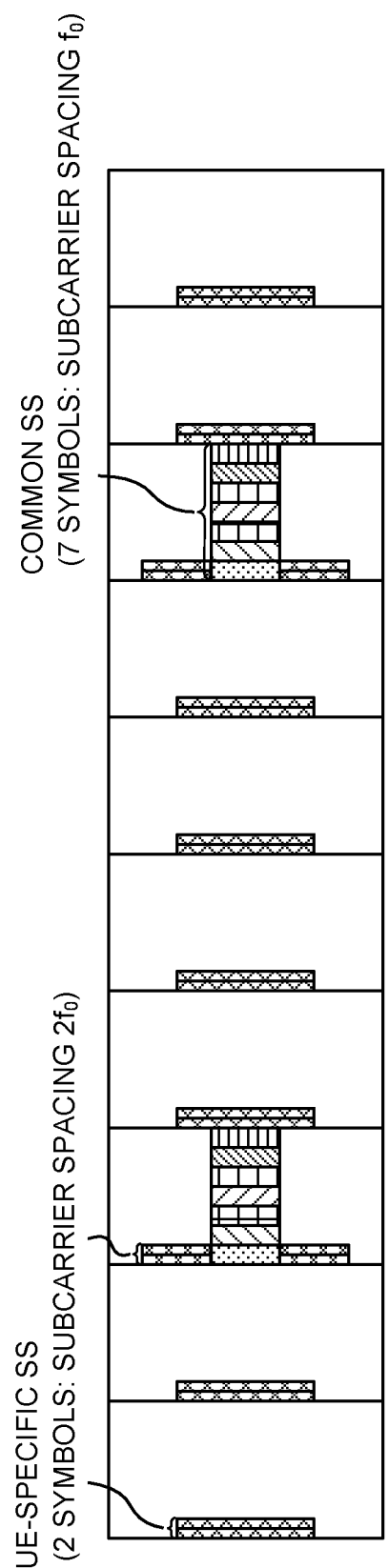
FIG. 6 is a diagram to show another example of the method of transmitting C-SS and UE-SS.

FIG. 6 shows an example of a case where downlink control information is transmitted by applying, to the C-SS of an NR-PDCCH, a subcarrier spacing (SCS) and a cycle that are lower and longer than those of the UE-SS. FIG. 6 shows a case where the subcarrier spacing for the C-SS is made $f_0$ and where the subcarrier spacing for the UE-SS is made twice that ($2 f_0$). Also, FIG. 6 show a case where the predetermined time periods are defined with slots, and where the cycle of the C-SS is five slots, the cycle of the UE-SS is one slot, and the C-SS and the UE-SS are both placed in a cycle of five slots.

In this case, the user terminal monitors both the C-SS and the UE-SS in slots in which the C-SS and the UE-SS are placed, and performs downlink control channel receiving processes. When both the C-SS and the UE-SS are placed (for example, frequency-multiplexed) in a given period of time, the frequency region for the UE-SS in this time period and the frequency region for the UE-SS in another time period where the C-SS is not placed may be provided in different positions (frequency regions). By this means, a structure can be adopted here, in which a frequency region where a C-SS is placed and a frequency region for a UE-SS of a time period where no C-SS is placed are allowed to overlap, thereby enabling flexible arrangement of the C-SS.

In the event the total number of control channel elements (also referred to as "NR-CCEs") included in the UE-SS in each time period is made approximately equal (for example, the same), a frequency region where the UE-SS is frequency-multiplexed with the C-SS and arranged may be configured bigger than other frequency regions in which the UE-SS is arranged (see FIG. 6).

Figure 7:
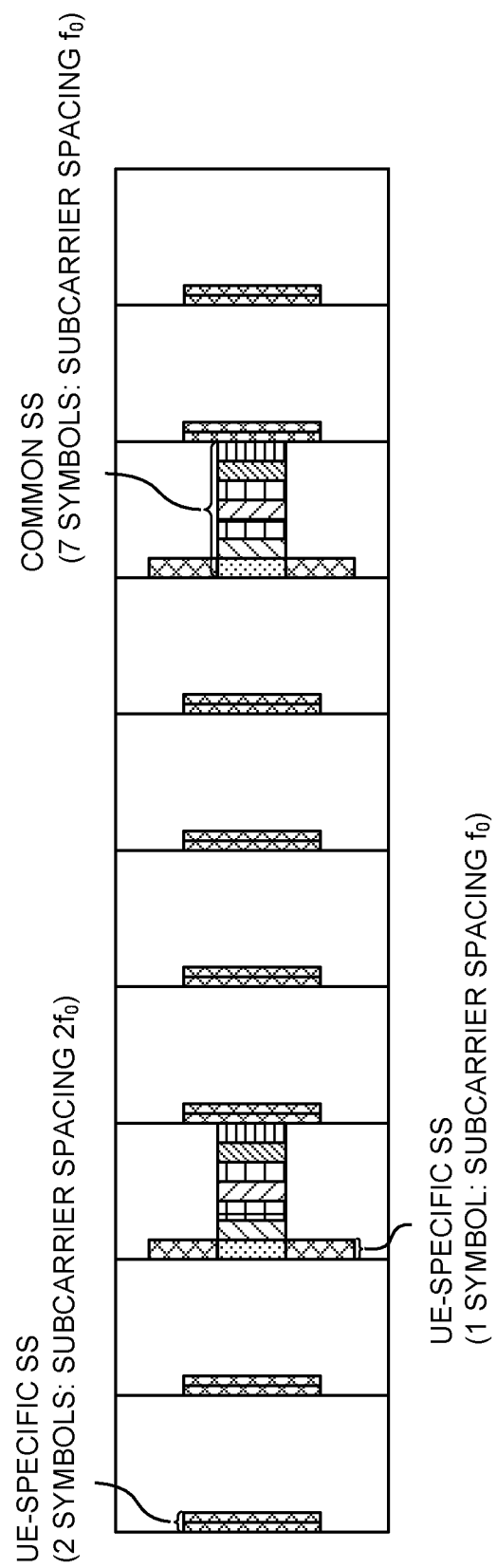
FIG. 7 is a diagram to show another example of the method of transmitting C-SS and UE-SS.

Also, in the time period when the user terminal monitors both the C-SS and the UE-SS, the subcarrier spacing of the UE-SS may be configured the same as the subcarrier spacing for the C-SS (see FIG. 7). In the case shown in FIG. 7, the subcarrier spacing for the UE-SS placed with the C-SS in the same time period is configured to the same value as that of the C-SS (here, $f_0$), and the subcarrier spacing for the UE-SS in time periods where the C-SS is not placed is configured to a different value (here, $2f_0$). Also, different numbers of symbols and/or different frequency resources may be configured and applied to UE-SSs with varying subcarrier spacings. Thus, by applying the same subcarrier spacing to the C-SS and the UE-SS placed in the same time period, the user terminal can perform signal processing such as an FFT (Fast Fourier Transform), channel estimation, data demodulation and so on, for the C-SS and for the UE-SS, simultaneously, so that it is possible to prevent the increase of the processing circuit scale and the increase of power consumption.

Figure 8:
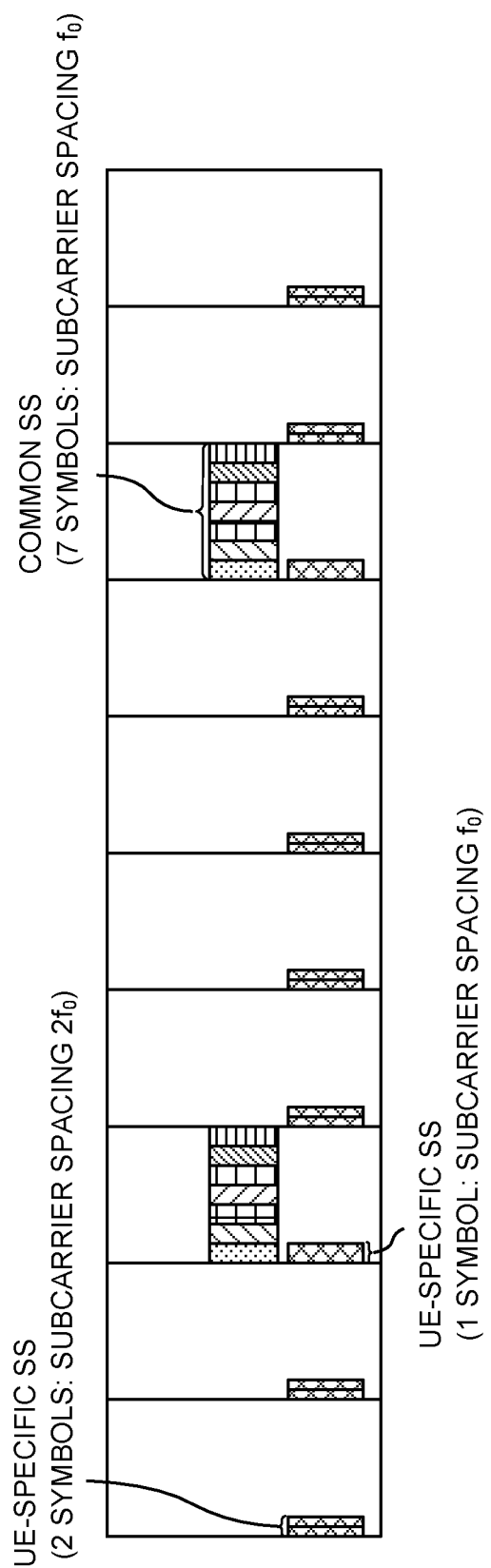
FIG. 8 is a diagram to show another examples of the method of transmitting C-SS and UE-SS.

Also, the frequency region for the C-SS and the frequency region for the UE-SS in a time period where the C-SS is not placed may be provided in different frequency positions so as not to overlap each other (see FIG. 8). FIG. 8 shows a case where the frequency region for the UE-SS that is frequency-multiplexed with the C-SS is placed in the same position as the frequency region for the UE-SS in time periods where the C-SS is not allocated (assigned). In this way, by adopting a structure in which the field for placing the C-SS and the field for placing the UE-SS do not overlap, the resources for control channels can be configured more flexibly.

Figure 9:
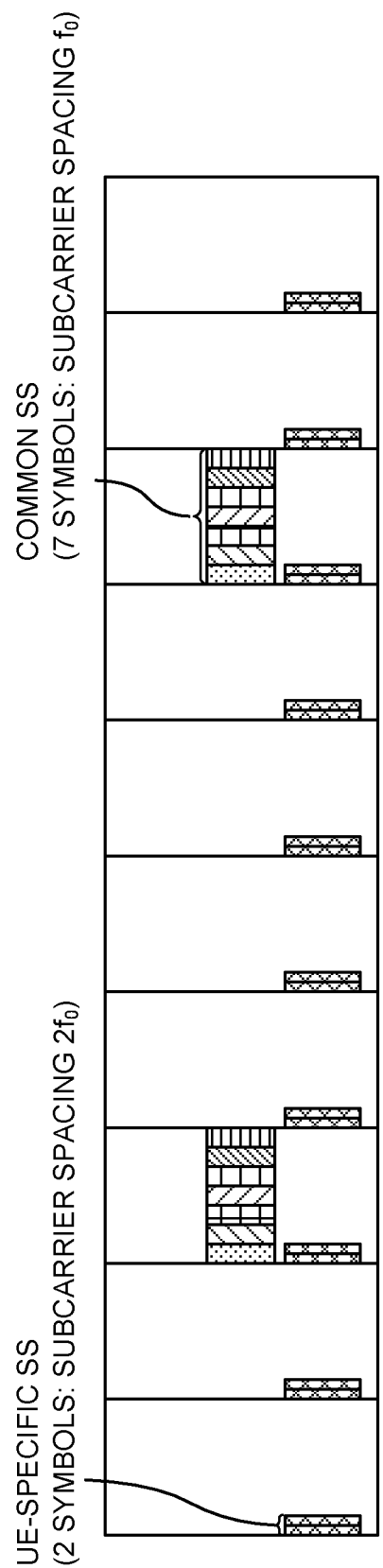
FIG. 9 is a diagram to show another example of the method of transmitting C-SS and UE-SS.

Also, although FIG. 8 shows a case where the subcarrier spacing for the C-SS and the subcarrier spacing of the UE-SS that is frequency-multiplexed in the same time period with the C-SS are the same value, these may be set to different values (see FIG. 9). FIG. 9 shows a case where the subcarrier spacing for the UE-SS that is arranged in each time period is kept at the same value (here, $2f_0$) and the subcarrier spacing for the C-SS is a different value (here, $f_0$) from that of the UE-SS. In this case, for example, the C-SS can narrow its subcarrier spacing, so as to increase the robustness against frequency-selective fading channels and improve the reliability, and the UE-SS can widen its subcarrier spacing and shorten the symbol duration, so as to enable processing with lower latency.

Figure 10:
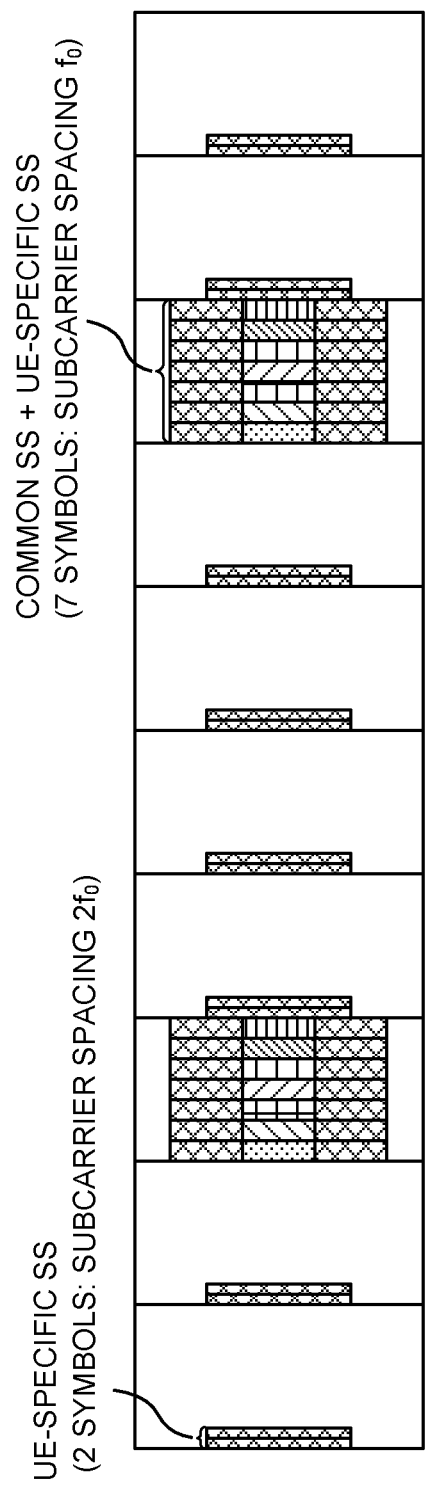
FIG. 10 is a diagram to show another examples of the method of transmitting C-SS and UE-SS.

Furthermore, in time periods where both the C-SS and the UE-SS are placed, the starting position of blind decoding for the UE-SS may be configured to be the same as the starting position of blind decoding for the C-SS. For example, when the C-SS is formed with seven symbols of a predetermined subcarrier spacing (here, $f_0$), the UE-SS to be placed in the same time period with the C-SS is formed with seven symbols of a predetermined subcarrier spacing (here, $f_0$) (see FIG. 10). In this manner, by making the position where blind decoding for the C-SS is started and the position where blind decoding for the UE-SS is started the same, while the capacity of the UE-SS can be increased, the UE-SS is processed at the timing the user terminal processes the C-SS, so that it is possible to process the UE-SS without increasing the processing load in the user terminal.

(Variations)

Although cases have been described above with the first aspect and the second aspect of the present invention where a lower subcarrier spacing (SCS) and a longer cycle than those of the UE-SS are applied to the C-SS in an NR-PDCCH, the present embodiment is not limited to this. A higher (or wider) subcarrier spacing and/or a shorter cycle than those of the UE-SS may be applied to the C-SS in the NR-PDCCH.

Figure 11A:
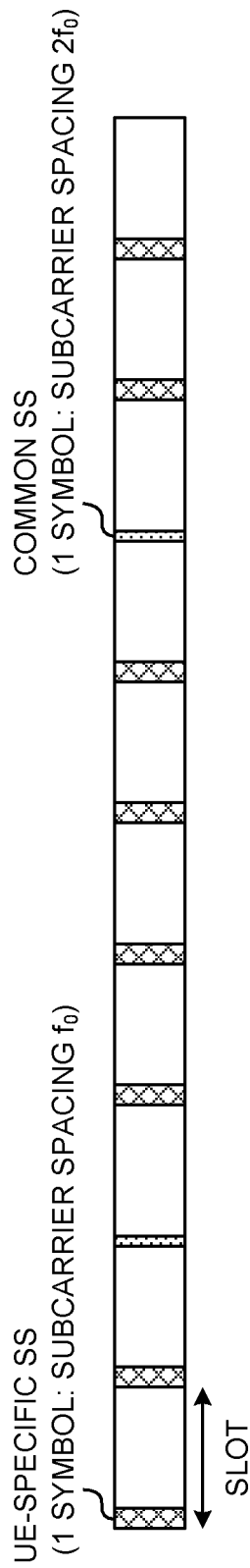
FIG. 11 is a diagram to show another examples of the method of transmitting C-SS and UE-SS.

FIG. 11A shows a case where the subcarrier spacing for the C-SS is made $2f_0$ and the subcarrier spacing for the UE-SS is made $f_0$. By this means, it is possible to prevent an increase in the overhead of common control information (common control signaling). Also, by applying, to the UE-SS in a downlink control channel, a lower (or narrower) subcarrier spacing and a shorter transmission cycle than those of the C-SS (or by transmitting the UE-SS a larger number of times), it is possible to cope with the increase of the capacity of the downlink control channel in relationship to time and/or frequency radio resources.

Figure 11B:
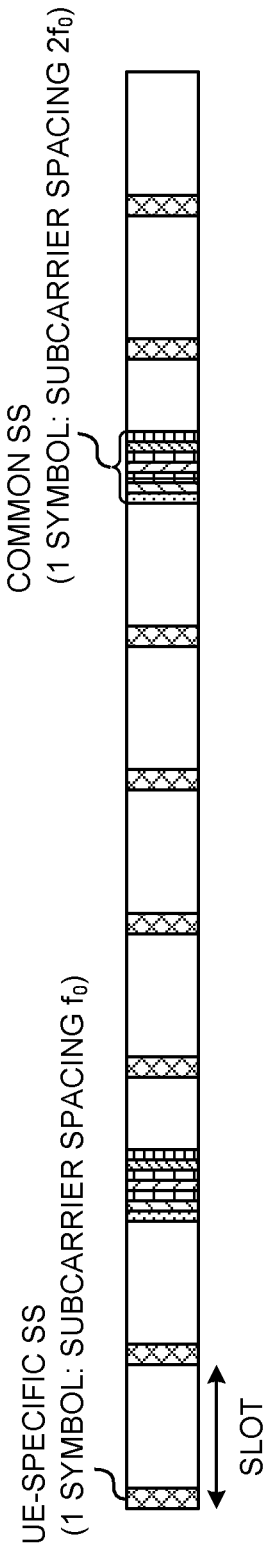

Also, the number of symbols and/or the frequency resources to use to transmit the C-SS and the UE-SS may be configured separately (for example, different numbers of symbols and/or different frequency resources may be used) (see FIG. 11B). FIG. 11B shows a case where the UE-SS is transmitted using one symbol with a subcarrier spacing of $f_0$, and where the C-SS is transmitted using seven symbols with a subcarrier spacing of $2f_0$.

Note that FIGS. 11A and 11B show cases where the predetermined time periods are defined with slots, and where the cycle of the C-SS is five slots. Also, although a case is illustrated here where the cycle of the UE-SS is one slot and the UE-SS is not configured in time periods in which the C-SS is provided, this is by no means limiting. The C-SS and the UE-SS may be placed (frequency-multiplexed and/or time-multiplexed) in the same time period, or the cycle of transmitting the C-SS may be configured shorter than the cycle for transmitting the UE-SS.

(Radio Communication System)

Now, the structure of the radio communication system according to one embodiment of the present invention will be described below. In this radio communication system, communication is performed using one or a combination of the radio communication methods according to the herein-contained embodiments of the present invention.

Figure 12:
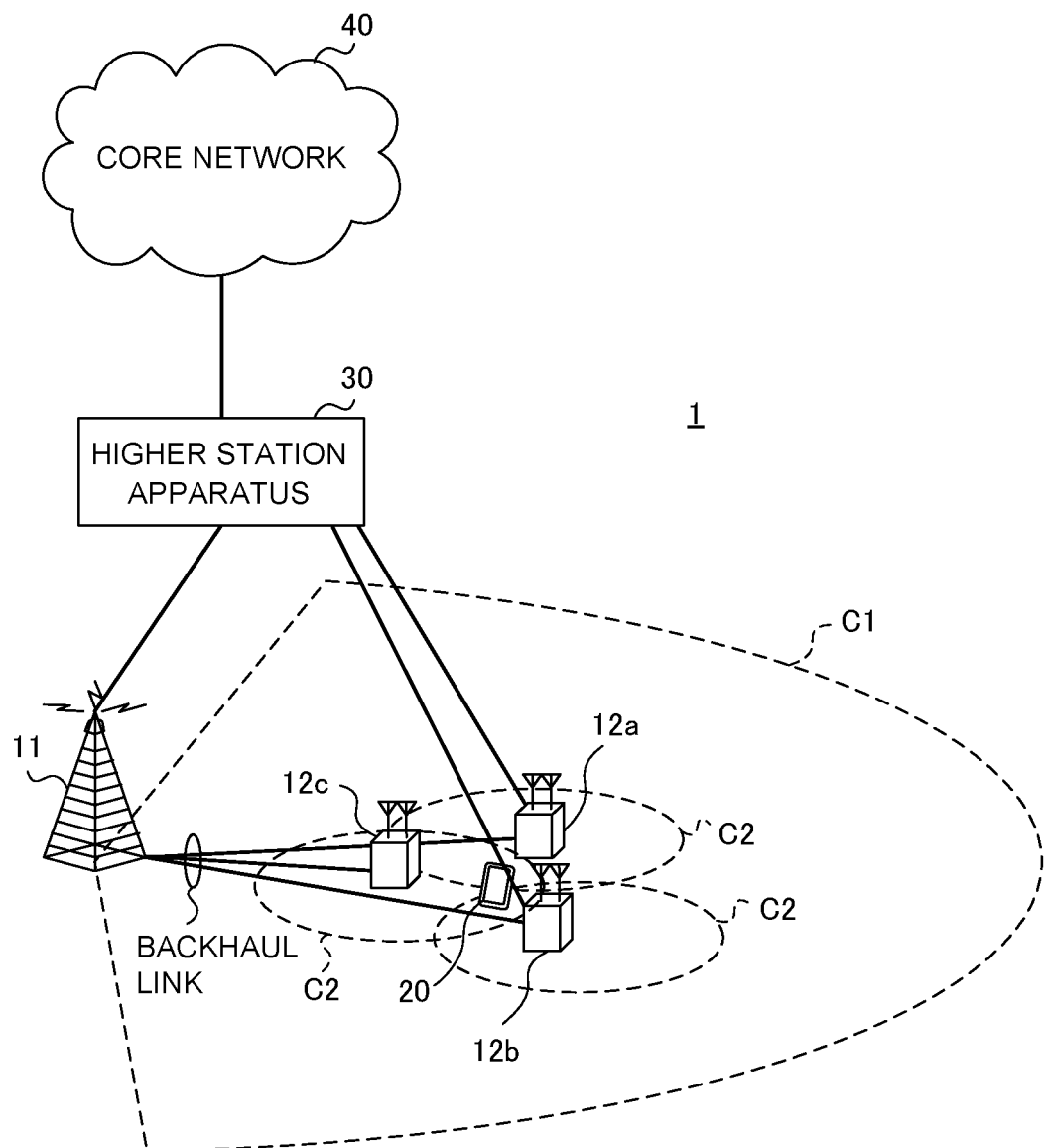
FIG. 12 is a diagram to show an example of a schematic structure of a radio communication system according to an embodiment of the present invention.

FIG. 12 is a diagram to show an example of a schematic structure of a radio communication system according to one embodiment of the present invention. A radio communication system 1 can adopt carrier aggregation (CA) and/or dual connectivity (DC) to group a plurality of fundamental frequency blocks (component carriers) into one, where the LTE system bandwidth (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "FRA (Future Radio Access)," "New-RAT (Radio Access Technology)," "NR (New Radio)" and so on, or may be seen as a system to implement these.

The radio communication system 1 includes a radio base station 11 that forms a macro cell C1 having a relatively wide coverage, and radio base stations 12 (12a to 12c) that are placed within the macro cell C1 and that form small cells C2, which are narrower than the macro cell C1. Also, user terminals 20 are placed in the macro cell C1 and in each small cell C2. The arrangement of cells and user terminals 20 are not limited to those shown in the drawings.

The user terminals 20 can connect with both the radio base station 11 and the radio base stations 12. The user terminals 20 may use the macro cell C1 and the small cells C2 at the same time by means of CA or DC. Furthermore, the user terminals 20 may apply CA or DC using a plurality of cells (CCs) (for example, five or fewer CCs or six or more CCs).

Between the user terminals 20 and the radio base station 11, communication can be carried out using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Note that the structure of the frequency band for use in each radio base station is by no means limited to these.

A structure may be employed here in which wire connection (for example, means in compliance with the CPRI (Common Public Radio Interface) such as optical fiber, the X2 interface and so on) or wireless connection is established between the radio base station 11 and the radio base station 12 (or between two radio base stations 12).

The radio base station 11 and the radio base stations 12 are each connected with higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB" (eNodeB), a "gNB," a "transmitting/receiving point" and so on. Also, the radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter the radio base stations 11 and 12 will be collectively referred to as "radio base stations 10," unless specified otherwise.

The user terminals 20 are terminals to support various communication schemes such as LTE, LTE-A and so on, and may be either mobile communication terminals (mobile stations) or stationary communication terminals (fixed stations).

In the radio communication system 1, as radio access schemes, orthogonal frequency division multiple access (OFDMA) is applied to the downlink, and single-carrier frequency division multiple access (SC-FDMA) is applied to the uplink.

OFDMA is a multi-carrier communication scheme to perform communication by dividing a frequency bandwidth into a plurality of narrow frequency bandwidths (subcarriers) and mapping data to each subcarrier. SC-FDMA is a single-carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are not limited to these combinations, and other radio access schemes may be used.

The radio communication system 1 may be configured so that different numerologies are used within cells and/or between cells. Note that a numerology refers to, for example, a set of communication parameters (for example, the subcarrier spacing, the bandwidth, etc.) that are used to transmit and receive a certain signal.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and SIBs (System Information Blocks) are communicated in the PDSCH. Also, the MIB (Master Information Block) is communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI), including PDSCH and PUSCH scheduling information, is communicated by the PDCCH. The number of OFDM symbols to use for the PDCCH is communicated by the PCFICH. HARQ (Hybrid Automatic Repeat reQuest) delivery acknowledgment information (also referred to as, for example, "retransmission control information," "HARQ-ACKs," "ACK/NACKs," etc.) in response to the PUSCH is transmitted by the PHICH. The EPDCCH is frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data, higher layer control information and so on are communicated by the PUSCH. Also, downlink radio quality information (CQI: Channel Quality Indicator), delivery acknowledgement information and so on are communicated by the PUCCH. By means of the PRACH, random access preambles for establishing connections with cells are communicated.

In the radio communication systems 1, the cell-specific reference signal (CRS: Cell-specific Reference Signal), the channel state information reference signal (CSI-RS: Channel State Information-Reference Signal), the demodulation reference signal (DMRS: DeModulation Reference Signal), the positioning reference signal (PRS: Positioning Reference Signal) and so on are communicated as downlink reference signals. Also, in the radio communication system 1, the measurement reference signal (SRS: Sounding Reference Signal), the demodulation reference signal (DMRS) and so on are communicated as uplink reference signals. Note that the DMRS may be referred to as a "user terminal-specific reference signal (UE-specific Reference Signal)." Also, the reference signals to be communicated are by no means limited to these.

(Radio Base Station)

Figure 13:
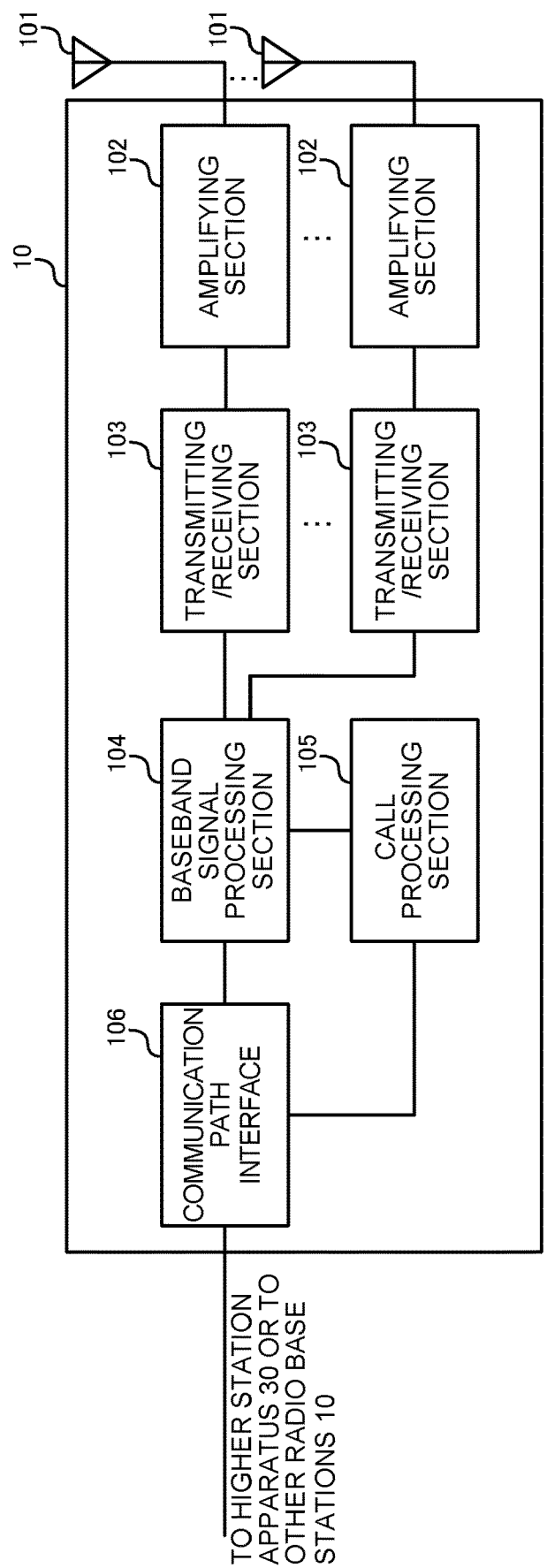
FIG. 13 is a diagram to show an example of an overall structure of a radio base station according to an embodiment of the present invention.

FIG. 13 is a diagram to show an example of an overall structure of a radio base station according to one embodiment of the present invention. A radio base station 10 has a plurality of transmitting/receiving antennas 101, amplifying sections 102, transmitting/receiving sections 103, a baseband signal processing section 104, a call processing section 105 and a communication path interface 106. Note that one or more transmitting/receiving antennas 101, amplifying sections 102 and transmitting/receiving sections 103 may be provided.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Baseband signals that are precoded and output from the baseband signal processing section 104 on a per antenna basis are converted into a radio frequency band in the transmitting/receiving sections 103, and then transmitted. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted by transmitters/receivers, transmitting/receiving circuits or transmitting/receiving apparatus that can b e described based on general understanding of the technical field to which the present invention pertains. Note that a transmitting/receiving section 103 may be structured as a transmitting/receiving section in one entity, or may be constituted by a transmitting section and a receiving section.

Meanwhile, as for uplink signals, radio frequency signals that are received in the transmitting/receiving antennas 101 are each amplified in the amplifying sections 102. The transmitting/receiving sections 103 receive the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (such as setting up and releasing communication channels), manages the state of the radio base stations 10 and manages the radio resources.

The communication path interface section 106 transmits and receives signals to and from the higher station apparatus 30 via a predetermined interface. Also, the communication path interface 106 may transmit and receive signals (backhaul signaling) with other radio base stations 10 via an inter-base station interface (which is, for example, optical fiber that is in compliance with the CPRI (Common Public Radio Interface), the X2 interface, etc.).

The transmitting/receiving sections 103 transmit a downlink control channel (for example, an NR-PDCCH) using a C-SS and/or a UE-SS. In addition, the transmitting/receiving sections 103 may transmit information about at least one of the subcarrier spacing, the transmission cycle (or the transmission position), the number of symbols (and/or the frequency resources) and the blind-decoding starting position, to apply to the C-SS and/or the UE-SS, to the user terminal 20, via higher layer signaling and/or physical layer signaling (L1 signaling).

Figure 14:
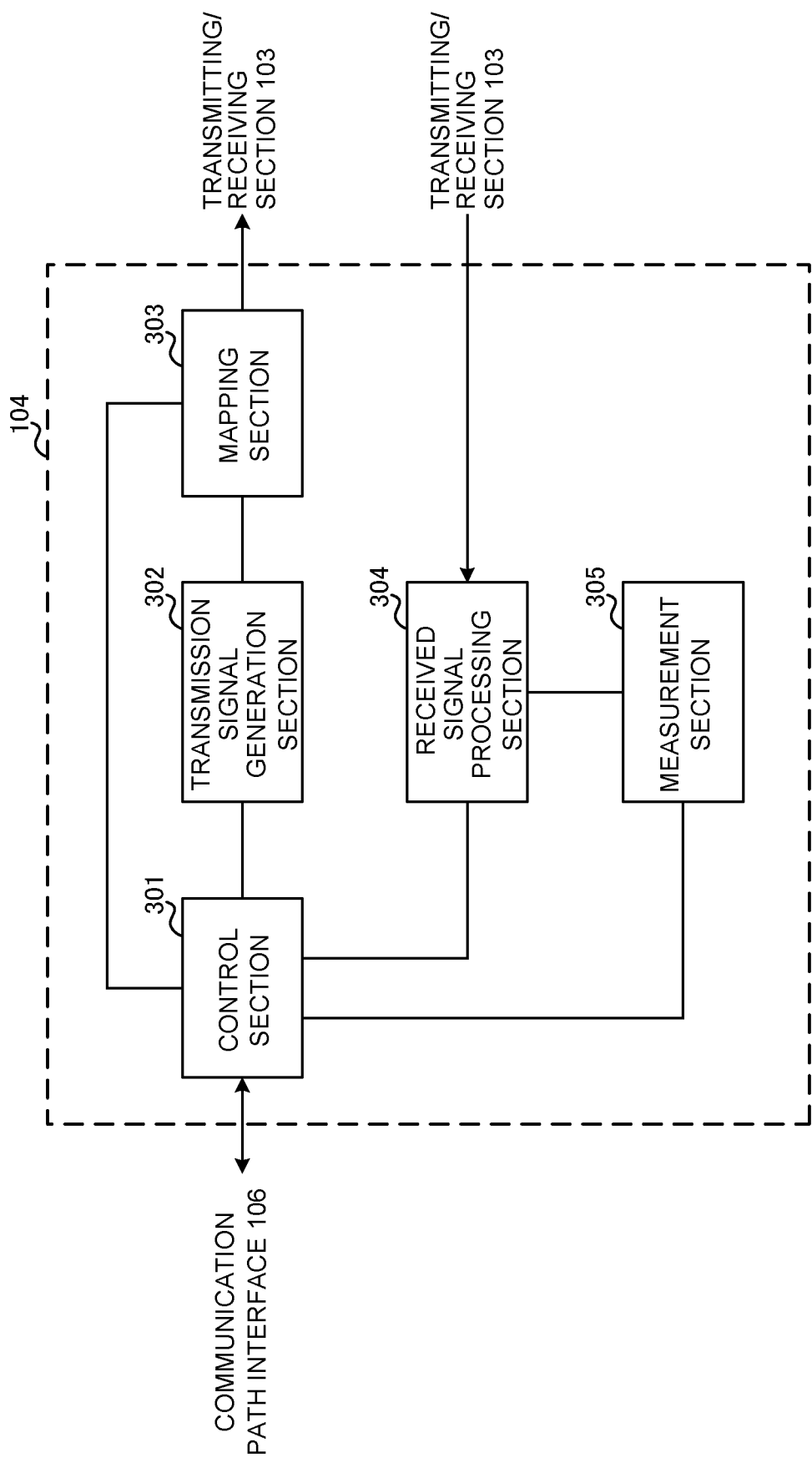
FIG. 14 is a diagram to show an example of a functional structure of a radio base station according to one embodiment of the present invention.

FIG. 14 is a diagram to show an example of a functional structure of a radio base station according to one embodiment of the present invention. Note that, although this example primarily shows functional blocks that pertain to characteristic parts of the present embodiment, the radio base station 10 has other functional blocks that are necessary for radio communication as well.

The baseband signal processing section 104 has a control section (scheduler) 301, a transmission signal generation section 302, a mapping section 303, a received signal processing section 304 and a measurement section 305. Note that these configurations have only to be included in the radio base station 10, and some or all of these configurations may not be included in the baseband signal processing section 104.

The control section (scheduler) 301 controls the whole of the radio base station 10. The control section 301 can be constituted by a controller, a control circuit or control apparatus that can be described based on general understanding of the technical field to which the present invention pertains.

The control section 301, for example, controls the generation of signals in the transmission signal generation section 302, the allocation of signals by the mapping section 303, and so on. Furthermore, the control section 301 controls the signal receiving processes in the received signal processing section 304, the measurements of signals in the measurement section 305, and so on.

The control section 301 controls the scheduling (for example, resource allocation) of system information, downlink data signals (for example, signals transmitted in the PDSCH) and downlink control signals (for example, signals communicated in downlink control channels). Also, the control section 301 controls the generation of downlink control signals (for example, delivery acknowledgement information and so on), downlink data signals and so on, based on whether or not retransmission control is necessary, which is decided in response to uplink data signals, and so on. Also, the control section 301 controls the scheduling of synchronization signals (for example, the PSS (Primary Synchronization Signal)/SSS (Secondary Synchronization Signal)), downlink reference signals (for example, the CRS, the CSI-RS, the DMRS, etc.) and so on.

In addition, the control section 301 controls the scheduling of uplink data signals (for example, signals transmitted in the PUSCH), uplink control signals (for example, signals transmitted in the PUCCH and/or the PUSCH), random access preambles transmitted in the PRACH, uplink reference signals, and so on.

The control section 301 controls the transmission of downlink control channels using the C-SS and/or the UE-SS. For example, the C-SS and the UE-SS are transmitted by applying different subcarrier spacings and/or different transmission cycles (see FIG. 2 and FIGS. 3). Also, the number of C-SS symbols and the number of UE-SS symbols (and/or the frequency resources) may be configured separately (see FIG. 4). In addition, the control section 301 may control the C-SS and/or the UE-SS to be transmitted using partial frequency regions (subbands) within the system band (see FIG. 5). Also, the C-SS and the UE-SS may be frequency-multiplexed and/or time-multiplexed and transmitted in a certain time period (for example, in a slot, a minislot, etc.) (see FIGS. 6 to 10, for example).

The transmission signal generation section 302 generates downlink signals (downlink control signals, downlink data signals, downlink reference signals and so on) based on commands from the control section 301, and outputs these signals to the mapping section 303. The transmission signal generation section 302 can be constituted by a signal generator, a signal generating circuit or signal generating apparatus that can be described based on general understanding of the technical field to which the present invention pertains.

For example, the transmission signal generation section 302 generates DL assignments, which report downlink signal allocation information, and UL grants, which report uplink signal allocation information, based on commands from the control section 301. Also, the downlink data signals are subjected to the coding process, the modulation process and so on, by using coding rates and modulation schemes that are determined based on, for example, channel state information (CSI) from each user terminal 20.

The mapping section 303 maps the downlink signals generated in the transmission signal generation section 302 to predetermined radio resources based on commands from the control section 301, and outputs these to the transmitting/receiving sections 103. The mapping section 303 can be constituted by a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals include, for example, uplink signals transmitted from the user terminals 20 (uplink control signals, uplink data signals, uplink reference signals and so on). For the received signal processing section 304, a signal processor, a signal processing circuit or signal processing apparatus that can be described based on general understanding of the technical field to which the present invention pertains can be used.

The received signal processing section 304 outputs the decoded information acquired through the receiving processes to the control section 301. For example, when a PUCCH to contain an HARQ-ACK is received, the received signal processing section 304 outputs this HARQ-ACK to the control section 301. Also, the received signal processing section 304 outputs the received signals and/or the signals after the receiving processes to the measurement section 305.

The measurement section 305 conducts measurements with respect to the received signals. The measurement section 305 can be constituted by a measurer, a measurement circuit or measurement apparatus that can be described based on general understanding of the technical field to which the present invention pertains.

When signals are received, the measurement section 305 may measure, for example, the received power (for example, RSRP (Reference Signal Received Power)), the received quality (for example, RSRQ (Reference Signal Received Quality)), SINR (Signal to Interference plus Noise Ratio) and/or the like), uplink channel information (for example CSI) and so on. The measurement results may be output to the control section 301.

(User Terminal)

Figure 15:
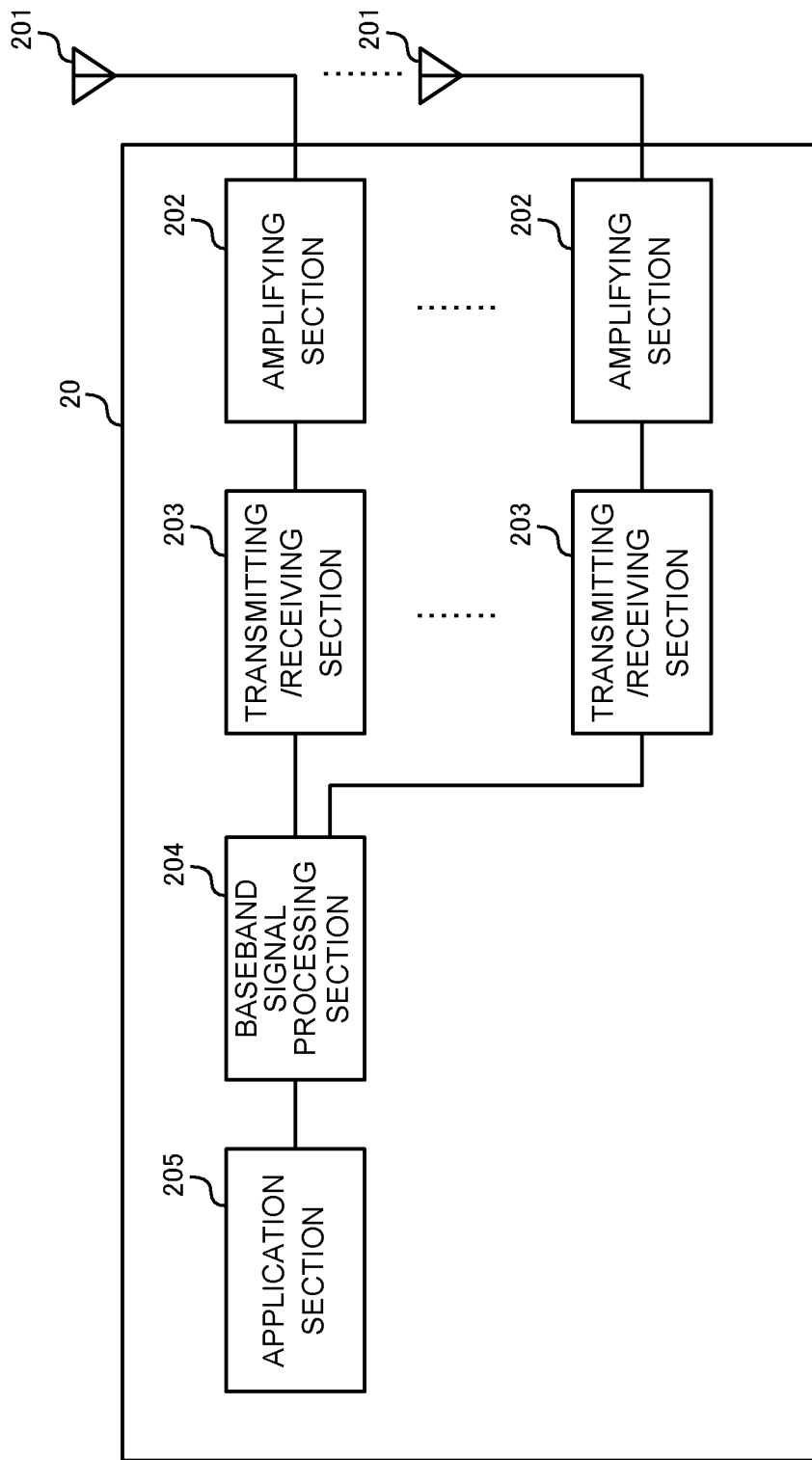
FIG. 15 is a diagram to show an example of an overall structure of a user terminal according to an embodiment of the present invention.

FIG. 15 is a diagram to show an example of an overall structure of a user terminal according to one embodiment of the present invention. A user terminal 20 has a plurality of transmitting/receiving antennas 201, amplifying sections 202, transmitting/receiving sections 203, a baseband signal processing section 204 and an application section 205. Note that one or more transmitting/receiving antennas 201, amplifying sections 202 and transmitting/receiving sections 203 may be provided.

Radio frequency signals that are received in the transmitting/receiving antennas 201 are amplified in the amplifying sections 202. The transmitting/receiving sections 203 receive the downlink signals amplified in the amplifying sections 202. The received signals are subjected to frequency conversion and converted into the baseband signal in the transmitting/receiving sections 203, and output to the baseband signal processing section 204. A transmitting/receiving section 203 can be constituted by a transmitters/ receiver, a transmitting/receiving circuit or transmitting/receiving apparatus that can be described based on general understanding of the technical field to which the present invention pertains. Note that a transmitting/receiving section 203 may be structured as a transmitting/receiving section in one entity, or may be constituted by a transmitting section and a receiving section.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Also, among the downlink data, the broadcast information may also be forwarded to the application section 205.

Meanwhile, uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving sections 203. Baseband signals that are output from the baseband signal processing section 204 are converted into a radio frequency band in the transmitting/receiving sections 203 and transmitted. The radio frequency signals that are subjected to frequency conversion in the transmitting/receiving sections 203 are amplified in the amplifying sections 202, and transmitted from the transmitting/receiving antennas 201.

The transmitting/receiving sections 203 receive a downlink control channel (for example, an NR-PDCCH) that is included in a C-SS and/or a UE-SS. In addition, the transmitting/receiving sections 203 receive information about at least one of the subcarrier spacing, the transmission cycle (or the transmission position), the number of symbols (and/or the frequency resources) and the blind-decoding starting position, to apply to the C-SS and/or the UE-SS, via higher layer signaling and/or physical layer signaling (L1 signaling).

Figure 16:
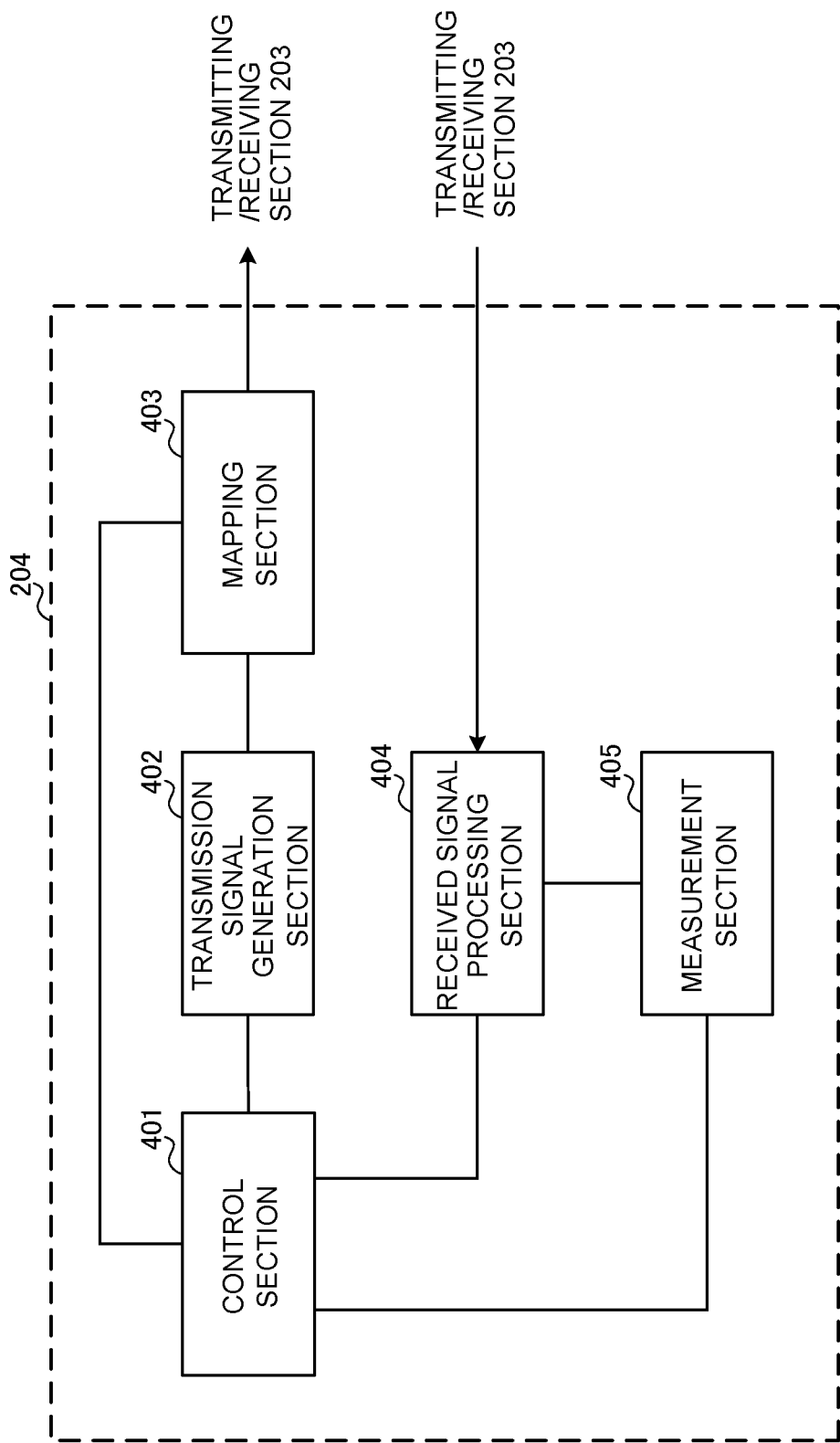
FIG. 16 is a diagram to show an example of a functional structure of a user terminal according to an embodiment of the present invention.

FIG. 16 is a diagram to show an example of a functional structure of a user terminal according to one embodiment of the present invention. Note that, although this example primarily shows functional blocks that pertain to characteristic parts of the present embodiment, the user terminal 20 has other functional blocks that are necessary for radio communication as well.

The baseband signal processing section 204 provided in the user terminal 20 at least has a control section 401, a transmission signal generation section 402, a mapping section 403, a received signal processing section 404 and a measurement section 405. Note that these configurations have only to be included in the user terminal 20, and some or all of these configurations may not be included in the baseband signal processing section 204.

The control section 401 controls the whole of the user terminal 20. For the control section 401, a controller, a control circuit or control apparatus that can be described based on general understanding of the technical field to which the present invention pertains can be used.

The control section 401, for example, controls the generation of signals in the transmission signal generation section 402, the allocation of signals in the mapping section 403, and so on. Furthermore, the control section 401 controls the signal receiving processes in the received signal processing section 404, the measurements of signals in the measurement section 405, and so on.

The control section 401 acquires the downlink control signals (for example, signals transmitted in downlink control channels) and downlink data signals (for example, signals transmitted in the PDSCH) transmitted from the radio base station 10, via the received signal processing section 404. The control section 401 controls the generation of uplink control signals (for example, delivery acknowledgement information and so on) and/or uplink data signals based on whether or not retransmission control is necessary, which is decided in response to downlink control signals and/or downlink data signals, and so on.

The control section 401 controls the detection of search spaces that serve as candidates for allocating downlink control channels. For example, the control section 401 controls the detection of a C-SS and a UE-SS, where different subcarrier spacings and/or different transmission cycles are configured (see FIG. 2).

A C-SS downlink control channel can be transmitted with a lower subcarrier spacing and/or in a longer cycle than UE-SS downlink control information (see FIG. 2). Alternatively, a C-SS downlink control channel may be transmitted with a longer subcarrier spacing and/or in a longer cycle than UE-SS downlink control information (see FIG. 11). Also, the C-SS and the UE-SS can be arranged to be time-multiplexed in a predetermined time period.

Also, the number of symbols where the C-SS is placed (and/or the frequency resources) and the number of symbols where the UE-SS is placed (and/or the frequency resources) may be configured separately (see FIG. 3). The C-SS and the UE-SS may be located in different frequency regions and/or frequency regions in a predetermined time period (see FIG. 5). Also, the C-SS and/or the UE-SS may be placed in partial frequency regions (subbands) within the system band. Also, the C-SS and the UE-SS may be frequency-multiplexed and/or time-multiplexed and transmitted in a certain time period (for example, in a slot, a minislot, etc.) (see FIGS. 6 to 10, for example).

The transmission signal generation section 402 generates uplink signals (uplink control signals, uplink data signals, uplink reference signals and so on) based on commands from the control section 401, and outputs these signals to the mapping section 403. The transmission signal generation section 402 can be constituted by a signal generator, a signal generating circuit or signal generating apparatus that can be described based on general understanding of the technical field to which the present invention pertains.

For example, the transmission signal generation section 402 generates uplink control signals related to delivery acknowledgement information, channel state information (CSI) and so on, based on commands from the control section 401. Also, the transmission signal generation section 402 generates uplink data signals based on commands from the control section 401. For example, when a UL grant is included in a downlink control signal that is reported from the radio base station 10, the control section 401 commands the transmission signal generation section 402 to generate an uplink data signal.

The mapping section 403 maps the uplink signals generated in the transmission signal generation section 402 to radio resources based on commands from the control section 401, and outputs the result to the transmitting/receiving sections 203. The mapping section 403 can be constituted by a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals include, for example, downlink signals (downlink control signals, downlink data signals, downlink reference signals and so on) that are transmitted from the radio base station 10. The received signal processing section 404 can be constituted by a signal processor, a signal processing circuit or signal processing apparatus that can be described based on general understanding of the technical field to which the present invention pertains. Also, the received signal processing section 404 can constitute the receiving section according to the present invention.

The received signal processing section 404 outputs the decoded information, acquired through the receiving processes, to the control section 401. The received signal processing section 404 outputs, for example, broadcast information, system information, RRC signaling, DCI and so on, to the control section 401. Also, the received signal processing section 404 outputs the received signals and/or the signals after the receiving processes to the measurement section 405.

The measurement section 405 conducts measurements with respect to the received signals. For example, the measurement section 405 performs measurements using downlink reference signals transmitted from the radio base station 10. The measurement section 405 can be constituted by a measurer, a measurement circuit or measurement apparatus that can be described based on general understanding of the technical field to which the present invention pertains.

The measurement section 405 may measure, for example, the received power (for example, RSRP), the received quality (for example, RSRQ, received SINR), down link channel information (for example CSI) and so on of the received signals. The measurement results may be output to the control section 401.

(Hardware Structure)

Note that the block diagrams that have been used to describe the above embodiments show blocks in functional units. These functional blocks (components) may be implemented in arbitrary combinations of hardware and/or software. Also, the means for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire or wireless, for example) and using these multiple pieces of apparatus.

Figure 17:
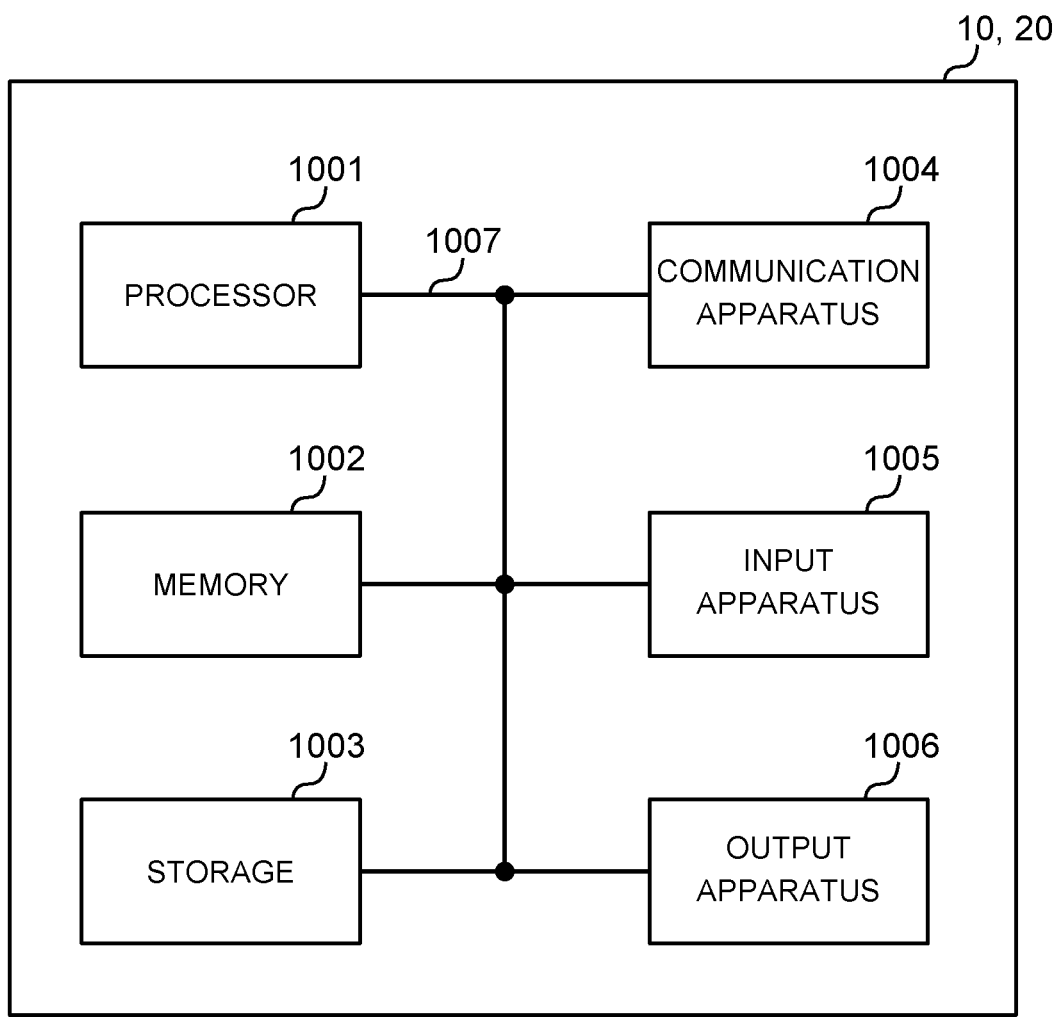
FIG. 17 is a diagram to show an example hardware structure of a radio base station and a user terminal according to an embodiment of the present invention.

For example, the radio base station, user terminals and so on according to embodiments of the present invention may function as a computer that executes the processes of the radio communication method of the present invention. FIG. 17 is a diagram to show an example hardware structure of a radio base station and a user terminal according to an embodiment of the present invention. Physically, the above-described radio base stations 10 and user terminals 20 may be formed as a computer apparatus that includes a processor 1001, a memory 1002, a storage 1003, communication apparatus 1004, input apparatus 1005, output apparatus 1006 and a bus 1007.

Note that, in the following description, the word "apparatus" may be replaced by "circuit," "device," "unit" and so on. Note that the hardware structure of a radio base station 10 and a user terminal 20 may be designed to include one or more of each apparatus shown in the drawings, or may be designed not to include part of the apparatus.

For example, although only one processor 1001 is shown, a plurality of processors may be provided. Furthermore, processes may be implemented with one processor, or processes may be implemented in sequence, or in different manners, on two or more processors. Note that the processor 1001 may be implemented with one or more chips.

Each function of the radio base station 10 and the user terminal 20 is implemented by reading predetermined software (program) on hardware such as the processor 1001 and the memory 1002, and by controlling the calculations in the processor 1001, the communication in the communication apparatus 1004, and the reading and/or writing of data in the memory 1002 and the storage 1003.

The processor 1001 may control the whole computer by, for example, running an operating system. The processor 1001 may be configured with a central processing unit (CPU), which includes interfaces with peripheral apparatus, control apparatus, computing apparatus, a register and so on. For example, the above-described baseband signal processing section 104 (204), call processing section 105 and so on may be implemented by the processor 1001.

Furthermore, the processor 1001 reads programs (program codes), software modules or data, from the storage 1003 and/or the communication apparatus 1004, into the memory 1002, and executes various processes according to these. As for the programs, programs to allow computers to execute at least part of the operations of the above-described embodiments may be used. For example, the control section 401 of the user terminals 20 may be implemented by control programs that are stored in the memory 1002 and that operate on the processor 1001, and other functional blocks may be implemented likewise.

The memory 1002 is a computer-readable recording medium, and may be constituted by, for example, at least one of a ROM (Read Only Memory), an EPROM (Erasable Programmable ROM), an EEPROM (Electrically EPROM), a RAM (Random Access Memory) and/or other appropriate storage media. The memory 1002 may be referred to as a "register," a "cache," a "main memory" (primary storage apparatus) and so on. The memory 1002 can store executable programs (program codes), software modules and/or the like for implementing the radio communication methods according to embodiments of the present invention.

The storage 1003 is a computer-readable recording medium, and may be constituted by, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, a key drive, etc.), a magnetic stripe, a database, a server, and/or other appropriate storage media. The storage 1003 may be referred to as "secondary storage apparatus."

The communication apparatus 1004 is hardware (transmitting/receiving device) for allowing inter-computer communication by using wired and/or wireless networks, and may be referred to as, for example, a "network device," a "network controller," a "network card," a "communication module" and so on. The communication apparatus 1004 may be configured to include a high frequency switch, a duplexer, a filter, a frequency synthesizer and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106 and so on may be implemented by the communication apparatus 1004.

The input apparatus 1005 is an input device for receiving input from the outside (for example, a keyboard, a mouse, a microphone, a switch, a button, a sensor and so on). The output apparatus 1006 is an output device for allowing sending output to the outside (for example, a display, a speaker, an LED (Light Emitting Diode) lamp and so on). Note that the input apparatus 1005 and the output apparatus 1006 may be provided in an integrated structure (for example, a touch panel).

Furthermore, these pieces of apparatus, including the processor 1001, the memory 1002 and so on are connected by the bus 1007 so as to communicate information. The bus 1007 may be formed with a single bus, or may be formed with buses that vary between pieces of apparatus.

Also, the radio base station 10 and the user terminal 20 may be structured to include hardware such as a microprocessor, a digital signal processor (DSP), an ASIC (Application-Specific Integrated Circuit), a PLD (Programmable Logic Device), an FPGA (Field Programmable Gate Array) and so on, and part or all of the functional blocks may be implemented by the hardware. For example, the processor 1001 may be implemented with at least one of these pieces of hardware.

(Variations)

Note that the terminology used in this specification and the terminology that is needed to understand this specification may be replaced by other terms that convey the same or similar meanings. For example, "channels" and/or "symbols" may be replaced by "signals (or "signaling")." Also, "signals" may be "messages." A reference signal may be abbreviated as an "RS," and may be referred to as a "pilot," a "pilot signal" and so on, depending on which standard applies. Furthermore, a "component carrier" (CC) may be referred to as a "cell," a "frequency carrier," a "carrier frequency" and so on.

Further, a radio frame may be comprised of one or more periods (frames) in the time domain. Each of one or more periods (frames) constituting a radio frame may be referred to as a "subframe." Further, a subframe may be comprised of one or more slots in the time domain. A subframe may be a fixed time duration (for example, one ms) not dependent on the neurology.

Furthermore, a slot may be comprised of one or more symbols in the time domain (OFDM (Orthogonal Frequency Division Multiplexing) symbols, SC-FDMA (Single Carrier Frequency Division Multiple Access) symbols, and so on). Also, a slot may be a time unit based on neurology. Also, a slot may include a plurality of mini-slots. Each mini-slot may consist of one or more symbols in the time domain. Also, a mini-slot may be referred to as a "subslot."

A radio frame, a subframe, a slot, a mini-slot and a symbol all represent the time unit in signal communication. A radio frame, a subframe, a slot, a mini-slot and a symbol may be each called by other applicable names. For example, one subframe may be referred to as a "transmission time interval" (TTI), or a plurality of consecutive subframes may be referred to as a "TTI," or one slot or mini-slot may be referred to as a "TTI." That is, a subframe and/or a TTI may be a subframe (one ms) in existing LTE, may be a shorter period than one ms (for example, one to thirteen symbols), or may be a longer period of time than one ms. Note that the unit to represent the TTI may be referred to as a "slot," a "mini slot" and so on, instead of a "subframe."

Here, a TTI refers to the minimum time unit of scheduling in radio communication, for example. For example, in LTE systems, a radio base station schedules the radio resources (such as the frequency bandwidth and transmission power that can be used in each user terminal) to allocate to each user terminal in TTI units. Note that the definition of TTIs is not limited to this.

The TTI may be the transmission time unit of channel-encoded data packets (transport blocks), code blocks and/or codewords, or may be the unit of processing in scheduling, link adaptation and so on. Note that when a TTI is given, the time interval (for example, the number of symbols) in which transport blocks, code blocks and/or codewords are actually mapped may be shorter than the TTI.

Note that, when one slot or one mini-slot is referred to as a "TTI," one or more TTIs (that is, one or more slots or one or more mini-slots) may be the minimum time unit of scheduling. Also, the number of slots (the number of mini-slots) to constitute this minimum time unit of scheduling may be controlled. A TTI having a time duration of one ms may be referred to as a "normal TTI" (TTI in LTE Rel. 8 to 12), a "long TTI," a "normal subframe," a "long subframe," and so on. A TTI that is shorter than a normal TTI may be referred to as a "shortened TTI," a "short TTI," "a partial TTI (or a "fractional TTI"), a "shortened subframe," a "short subframe," a "mini-slot," "a sub-slot" and so on.

Note that a long TTI (for example, a normal TTI, a subframe, etc.) may be replaced with a TTI having a time duration exceeding one ms, and a short TTI (for example, a shortened TTI) may be replaced with a TTI having a TTI length less than the TTI length of a long TTI and not less than one ms.

A resource block (RB) is the unit of resource allocation in the time domain and the frequency domain, and may include one or a plurality of consecutive subcarriers in the frequency domain. Also, an RB may include one or more symbols in the time domain, and may be one slot, one mini-slot, one subframe or one TTI in length. One TTI and one subframe each may be comprised of one or more resource blocks. Note that one or more RBs may be referred to as a "physical resource block (PRB: Physical RB)," a "subcarrier group (SCG: Sub-Carrier Group)," a "resource element group (REG)," an "PRB pair," an "RB pair" and so on.

Furthermore, a resource block may be comprised of one or more resource elements (REs). For example, one RE may be a radio resource field of one subcarrier and one symbol.

Note that the structures of radio frames, subframes, slots, mini-slots, symbols and so on described above are merely examples. For example, configurations pertaining to the number of subframes included in a radio frame, the number of slots included in a subframe, the number of mini-slots included in a slot, the number of symbols and RBs included in a slot or a mini-slot, the number of subcarriers included in an RB, the number of symbols in a TTI, the symbol duration, the length of cyclic prefixes (CPs) and so on can be variously changed.

Also, the information and parameters described in this specification may be represented in absolute values or in relative values with respect to predetermined values, or may be represented in other information formats. For example, radio resources may be specified by predetermined indices. In addition, equations to use these parameters and so on may be used, apart from those explicitly disclosed in this specification.

The names used for parameters and so on in this specification are in no respect limiting. For example, since various channels (PUCCH (Physical Uplink Control Channel), PDCCH (Physical Downlink Control Channel) and so on) and information elements can be identified by any suitable names, the various names assigned to these individual channels and information elements are in no respect limiting.

The information, signals and/or others described in this specification may be represented by using a variety of different technologies. For example, data, instructions, commands, information, signals, bits, symbols and chips, all of which may be referenced throughout the herein-contained description, may be represented by voltages, currents, electromagnetic waves, magnetic fields or particles, optical fields or photons, or any combination of these.

Also, information, signals and so on can be output from higher layers to lower layers and/or from lower layers to higher layers. Information, signals and so on may be input and output via a plurality of network nodes.

The information, signals and so on that are input may be transmitted to other pieces of apparatus. The information, signals and so on to be input and/or output can be overwritten, updated or appended. The information, signals and so on that are output may be deleted. The information, signals and so on that are input may be transmitted to other pieces of apparatus.

Reporting of information is by no means limited to the examples/embodiments described in this specification, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (the master information block (MIB), system information blocks (SIBs) and so on), MAC (Medium Access Control) signaling and so on), and other signals and/or combinations of these.

Note that physical layer signaling may be referred to as "L1/L2 (Layer 1/Layer 2) control information" (L1/L2 control signals), "L1 control information" (L1 control signal) and so on. Also, RRC signaling may be referred to as "RRC messages," and can be, for example, an RRC connection setup message, RRC connection reconfiguration message, and so on. Also, MAC signaling may be reported using, for example, MAC control elements (MAC CEs (Control Elements)).

Also, reporting of predetermined information (for example, reporting of information to the effect that "X holds") does not necessarily have to be sent explicitly, and can be sent implicitly (by, for example, not reporting this piece of information).

Decisions may be made in values represented by one bit (0 or 1), may be made in Boolean values that represent true or false, or may be made by comparing numerical values (for example, comparison against a predetermined value).

Software, whether referred to as "software," "firmware," "middleware," "microcode" or "hardware description language," or called by other names, should be interpreted broadly, to mean instructions, instruction sets, code, code segments, program codes, programs, subprograms, software modules, applications, software applications, software packages, routines, subroutines, objects, executable files, execution threads, procedures, functions and so on.

Also, software, commands, information and so on may be transmitted and received via communication media. For example, when software is transmitted from a website, a server or other remote sources by using wired technologies (coaxial cables, optical fiber cables, twisted-pair cables, digital subscriber lines (DSL) and so on) and/or wireless technologies (infrared radiation, microwaves and so on), these wired technologies and/or wireless technologies are also included in the definition of communication media.

The terms "system" and "network" as used herein are used interchangeably.

As used herein, the terms "base station (BS)," "radio base station," "eNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or more (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs: Remote Radio Heads)). The term "cell" or "sector" refers to part or all of the coverage area of a base station and/or a base station subsystem that provides communication services within this coverage.

As used herein, the terms "mobile station (MS)" "user terminal," "user equipment (UE)" and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client" or some other suitable terms.

Further, the radio base stations in this specification may be interpreted as user terminals. For example, each aspect/embodiment of the present invention may be applied to a configuration in which communication between a radio base station and a user terminal is replaced with communication among a plurality of user terminals (D2D: Device-to-Device). In this case, user terminals 20 may have the functions of the radio base stations 10 described above. In addition, terms such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Certain actions which have been described in this specification to be performed by base station may, in some cases, be performed by upper nodes. In a network comprised of one or more network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The examples/embodiments illustrated in this specification may be used individually or in combinations, which may be switched depending on the mode of implementation. The order of processes, sequences, flowcharts and so on that have been used to describe the examples/embodiments herein may be re-ordered as long as inconsistencies do not arise. For example, although various methods have been illustrated in this specification with various components of steps in exemplary orders, the specific orders that are illustrated herein are by no means limiting.

The examples/embodiments illustrated in this specification may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR (New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate systems and/or next-generation systems that are enhanced based on these.

The phrase "based on" as used in this specification does not mean "based only on," unless otherwise specified. In other words, the phrase "based on" means both "based only on" and "based at least on."

Reference to elements with designations such as "first," "second" and so on as used herein does not generally limit the number/quantity or order of these elements. These designations are used only for convenience, as a method for distinguishing between two or more elements. Thus, reference to the first and second elements does not imply that only two elements may be employed, or that the first element must precede the second element in some way.

The terms "judge" and "determine" as used herein may encompass a wide variety of actions. For example, to "judge" and "determine" as used herein may be interpreted to mean making judgements and determinations related to calculating, computing, processing, deriving, investigating, looking up (for example, searching a table, a database or some other data structure, ascertaining and so on. Furthermore, to "judge" and "determine" as used herein may be interpreted to mean making judgements and determinations related to receiving (for example, receiving information), transmitting (for example, transmitting information), inputting, outputting, accessing (for example, accessing data in a memory) and so on. In addition, to "judge" and "determine" as used herein may be interpreted to mean making judgements and determinations related to resolving, selecting, choosing, establishing, comparing and so on. In other words, to "judge" and "determine" as used herein may be interpreted to mean making judgements and determinations related to some action.

As used herein, the terms "connected" and "coupled," or any variation of these terms, mean all direct or indirect connections or coupling between two or more elements, and may include the presence of one or more intermediate elements between two elements that are "connected" or "coupled" to each other. The coupling or connection between the elements may be physical, logical or a combination thereof. For example, "connection" may be interpreted as "access." As used herein, two elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical regions (both visible and invisible).

When terms such as "include," "comprise" and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

This disclosure of Japanese Patent Application No. 2016-242219, filed on Dec. 14, 2016, including the specification, drawings and abstract, is incorporated herein by reference in its entirety.

The invention claimed is:

1. A terminal comprising:
a receiver that receives a downlink control channel; and
a processor that monitors a common search space included in a first search space set and a UE-specific search space included in a second search space set which are candidates for the downlink control channel,
wherein transmission periodicity of the common search space and transmission periodicity of the UE-specific search space are respectively configured by higher layer signaling,
a number of transmission symbols for the common search space and a number of transmission symbols for the UE-specific search space are respectively configured by the higher layer signaling,
a symbol starting-position of the common search space and a symbol-starting position of the terminal-specific search space are respectively configured by the higher layer signaling, and
the processor supports the transmission periodicity configured in the common search space being shorter than the transmission periodicity configured in the UE-specific search space.

2. The terminal according to claim 1, wherein the processor supports monitoring of the common search space and the UE-specific search space to which different subcarrier spacings are respectively configured.

3. A radio communication method for a terminal comprising:
receiving a downlink control channel; and
monitoring a common search space included in a first search space set and a UE-specific search space included in a second search space set which are candidates for the downlink control channel,
wherein transmission periodicity of the common search space and transmission periodicity of the UE-specific search space are respectively configured by higher layer signaling,
a number of transmission symbols for the common search space and a number of transmission symbols for the UE-specific search space are respectively configured by the higher layer signaling,
a symbol starting-position of the common search space and a symbol-starting position of the terminal-specific search space are respectively configured by the higher layer signaling, and the terminal supports the transmission periodicity configured in the common search space being shorter than the transmission periodicity configured in the UE-specific search space.

4. A base station comprising:
a transmitter that transmits a downlink control channel; and
a processor that controls transmission of the downlink control channel using a common search space included in a first search space set and a UE-specific search space included in a second search space set, which are each respectively configured with a transmission periodicity, a number of transmission symbols and a symbol starting-position,
wherein the transmission periodicity configured in the common search space being shorter than the transmission periodicity configured in the UE-specific search space is supported by a terminal.

5. A system comprising a terminal and a base station, wherein:
the terminal comprises:
a receiver that receives a downlink control channel; and
a processor of the terminal that monitors a common search space included in a first search space set and a UE-specific search space included in a second search space set which are candidates for the downlink control channel,
the base station comprises:
a transmitter that transmits the downlink control channel; and
a processor of the base station that controls transmission of the downlink control channel using the common search space and the UE-specific search space,
wherein transmission periodicity of the common search space and transmission periodicity of the UE-specific search space are respectively configured by higher layer signaling,
a number of transmission symbols for the common search space and a number of transmission symbols for the UE-specific search space are respectively configured by the higher layer signaling,
a symbol starting-position of the common search space and a symbol-starting position of the terminal-specific search space are respectively configured by the higher layer signaling, and
the processor of the terminal supports the transmission periodicity configured in the common search space being shorter than the transmission periodicity configured in the UE-specific search space.

\* \* \* \* \*